US006748132B1

(12) United States Patent
Kapany et al.

(10) Patent No.: US 6,748,132 B1
(45) Date of Patent: Jun. 8, 2004

(54) WAVELENGTH ADD DROP ELEMENT FOR CONFIGURABLE ADD DROP MULTIPLEXING

(75) Inventors: Narinder Kapany, Woodside, CA (US); Claire Gu, Santa Cruz, CA (US); Meric Ozcan, Mountain View, CA (US)

(73) Assignee: K2 Optronics, Inc., Sunnyvale, CA (US)

( * ) Notice: Subject to any disclaimer, the term of this patent is extended or adjusted under 35 U.S.C. 154(b) by 227 days.

(21) Appl. No.: 09/794,231

(22) Filed: Feb. 26, 2001

(51) Int. Cl.[7] ................................................. G02B 6/28
(52) U.S. Cl. ............................. 385/24; 385/18; 385/25; 385/36
(58) Field of Search ............................. 385/24, 16, 17, 385/18, 25, 31, 36, 39

(56) References Cited

U.S. PATENT DOCUMENTS

| 4,478,494 | A | 10/1984 | Soref ........................... 350/381 |
| 4,580,873 | A | 4/1986 | Levinson .................... 350/96.2 |
| 4,630,883 | A | 12/1986 | Taylor et al. ............. 350/96.15 |
| 4,674,828 | A | 6/1987 | Takahashi et al. ........ 350/96.13 |
| 4,681,397 | A | 7/1987 | Bhatt .......................... 350/96.2 |
| 4,714,326 | A | 12/1987 | Usui et al. ................... 350/485 |
| 4,846,542 | A | 7/1989 | Okayama et al. ......... 350/96.15 |
| 5,221,987 | A | 6/1993 | Laughlin ..................... 354/222 |
| 5,255,332 | A | 10/1993 | Welch et al. .................. 385/17 |
| 5,283,844 | A | 2/1994 | Rice et al. ..................... 385/17 |
| 5,581,643 | A | 12/1996 | Wu .............................. 385/17 |
| 5,699,462 | A | 12/1997 | Fouquet et al. ................ 385/18 |
| 5,960,131 | A | 9/1999 | Fouquet et al. ................ 385/17 |
| 5,999,307 | A | 12/1999 | Whitehead et al. .......... 359/298 |
| 6,022,671 | A | 2/2000 | Binkley et al. ............... 430/321 |
| 6,154,586 | A | 11/2000 | MacDonald et al. .......... 385/18 |
| 6,404,941 | B1 | * 6/2002 | Picard et al. .................. 385/18 |

FOREIGN PATENT DOCUMENTS

| EP | 0310184 A1 | 9/1988 |
| EP | 0907091 A2 | 9/1998 |
| JP | 63-197923 | 8/1988 |
| JP | 2-179621 | 7/1990 |

* cited by examiner

*Primary Examiner*—Brian Healy
*Assistant Examiner*—Sung Pak
(74) *Attorney, Agent, or Firm*—Townsend and Townsend and Crew LLP

(57) ABSTRACT

A configurable wavelength multiplexing device having first, second, and third reflectors. The first reflector has a first state in which it transmits incoming light (having first and second wavelengths) along a first transmitted path and a second state in which it reflects the light along a first reflected path. The second reflector reflects the first wavelength and transmits the second wavelength. The third reflector reflects the first wavelength. The first, second, and third reflectors are oriented so that when the incoming light is transmitted along the first transmitted path, the first wavelength is reflected by the second and third reflectors to travel along second and third reflected paths, the third reflected path intersects the first reflector at an angle such that the first wavelength is transmitted by the first reflector and continues on the first reflected path, and the second wavelength is transmitted by the second reflector.

64 Claims, 16 Drawing Sheets

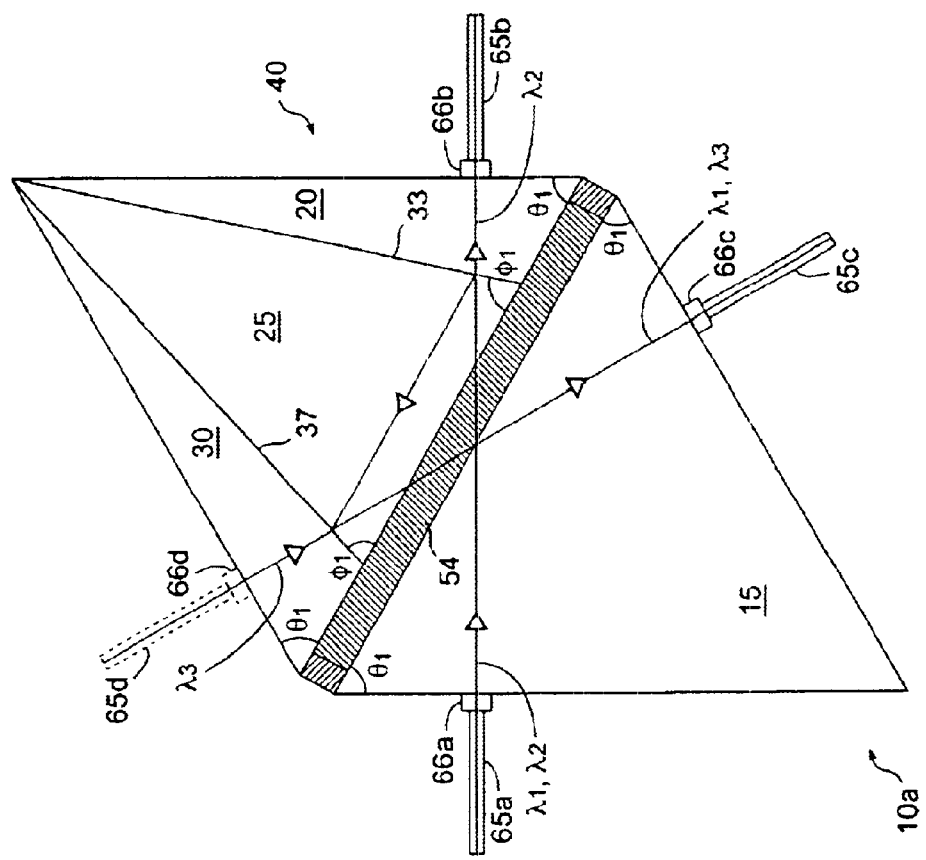
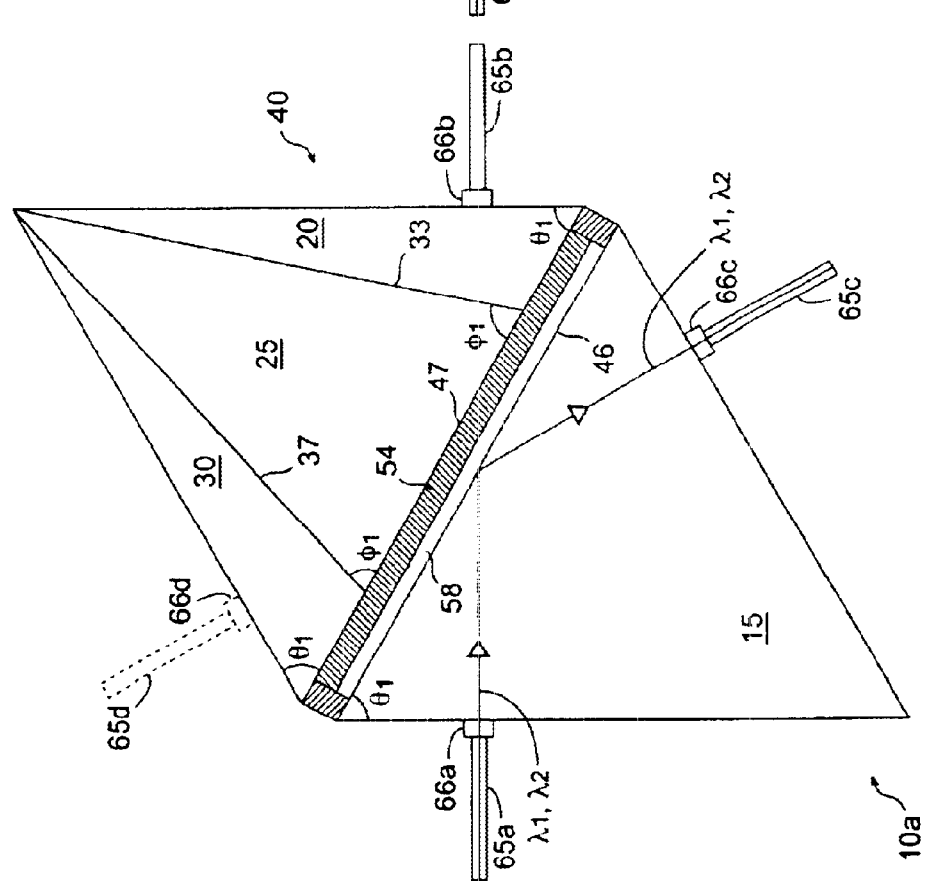

WAVELENGTH ADD DROP ELEMENT FOR CONFIGURABLE ADD DROP MULTIPLEXING

BACKGROUND OF THE INVENTION

This application relates generally to fiber optics and more specifically to fiber optic switching devices.

For high bandwidth fiber optics communication systems, an important functional need is to add or drop particular channels at a particular node. For example, there is a need to add optical signals from various optical channels/nodes onto a trunk line and drop optical signals from a trunk line onto various channels. Adding and dropping should occur with low insertion loss and low crosstalk. That is, an effective optical add drop multiplexer should add a significant fraction of the light from an optical channel to an intended trunk line and add substantially none of the light to unintended channels. Light coupled to unintended channels is referred to as crosstalk and is typically expressed in terms of attenuation. Attenuation if expressed in decibels or dB, and −50 dB is generally considered a target performance level. Moreover, an effective optical add drop multiplexer should drop optical signals, such that a significant fraction of the light is dropped from a trunk line into a designated optical channel and substantially none of the light from the trunk line should be coupled to unintended channels. A trunk line can be any optical transmission line that carries multiple optical signals such as the optical rings of a SONET network, or long or short haul transmission lines. Optical channels to which optical signals are dropped or from which optical signals are added to a trunk line, include for example end user channels or other networks. Such optical channels may carry single optical signals or multiple optical signals to be further distributed.

A beneficial function for add drop multiplexing is configurability. Configurability provides for optical signals to be either dropped from a trunk line at a node, or to be kept on the trunk line and bypass the node. Such features provide numerous benefits to optical networking. For example, trunk lines can have nodes that can be bypassed until a node is ready for use. This is particularly valuable when new optical networks are installed but individual end users are not prepared to hook up to the optical network. Such end users can be bypassed and later switched into the optical network quickly and inexpensively without the necessity of additional hardware installation.

A further beneficial function for add drop multiplexing is the preservation of the intensity of the various polarizations of an optical signal as it traverses the various components of an add drop multiplexer. In other words, an incoming beam should not be split according to its variously polarized component signals. Preserving intensity of the various polarizations of the incoming beam serves to effectively lower insertion loss and crosstalk. In addition to the functional performance characteristics mentioned above, it is desirable that the add drop be reliable, compact, and inexpensive.

Prior art optical add drop multiplexers include such devices as, non-configurable add drop multiplexers, star coupler devices, as well as other devices. While all of these technologies have been demonstrated for optical add drop multiplexing, their cost to manufacture and use can be relatively high. For example, in optical networks using non-configurable add drops, the bypassing of a node usually requires the installation of costly optical regeneration hardware. Regeneration hardware needs to be added at non-used nodes to add optical signals back onto a trunk line, because the optical signals were necessarily dropped due to a lack of configurability. In a further example, optical networks having star coupler devices, often require the use of optical regeneration after multiplexing or demultiplexing because of relatively high signal attenuation associated with such devices. Thus, considerable efforts are still ongoing to develop an all optical add drop multiplexer characterized by configurability, low loss and crosstalk, high speed and reliability, small overall size, and low cost.

As is well known, typical single-mode fiber optics communications are at wavelengths in the 1300-nm and 1550-nm ranges. The International Telecommunications Union (ITU) has defined a standard wavelength grid having a frequency band centered at 193,100 GHz, and other bands spaced at 100 GHz intervals around 193,100 GHz. This corresponds to a wavelength spacing of approximately 0.8 nm around a center wavelength of approximately 1550 nm, it being understood that the grid is uniform in frequency and only approximately uniform in wavelength. Implementation at other grid spacings (e.g. 25 GHZ, 50 GHz, 200 GHz, etc.) are also permitted. This frequency range and frequency spacings provides an enormous bandwidth for use in audio, video, audio-video as well as other communications needs such as the Internet and provides an impetus to develop optical technologies to exploit such bandwidth, such as all optical add drop elements for configurable add drop multiplexers with the previously listed characteristics.

SUMMARY OF THE INVENTION

The present invention provides a wavelength add drop element (WADE) for use in configurable wavelength add drop multiplexing.

The WADE includes first, second, and third reflectors. The first reflector, referred to as the configurable reflector, is disposed to intercept the incoming light (having at least first and second wavelengths) traveling along an input path. The first reflector has a first state in which it transmits the incoming light along a first transmitted path and a second state in which it reflects the incoming light along a first reflected path. The second reflector is a wavelength-selective reflector that reflects light of at least the first wavelength and transmits light of the second wavelength. The third reflector reflects at least light of the first wavelength. The first, second, and third reflectors are oriented so that when the incoming light is transmitted along the first transmitted path, the light of the first wavelength is reflected by the second and third reflectors to travel along second and third reflected paths. The third reflected path intersects the first reflector at an angle such that the light of the first wavelength is transmitted by the first reflector and continues on the first reflected path. Light of the second wavelength is transmitted by the second reflector along a second transmission path that is distinct from the first transmission path. The first, second, and third reflectors are further oriented so that the first transmitted and reflected paths are more than 45 degrees from the normal to the first reflector, and the second transmitted path is less than 22.5 degrees from the normal to the second reflector.

In some embodiments the first reflector is located in a routing region bounded on first and second sides by a first transparent material having a refractive index greater than 1. Further, the first reflector includes a body of a second transparent material having a refractive index greater than 1 disposed in the routing region. The first reflector body has a contracted state at a first temperature and an expanded state at a second temperature. The contracted state defines an air gap disposed in the path of the incoming light traveling along the input path so as to cause the incoming light to be deflected onto the first reflected path through total internal reflection. The expanded state removes the air gap disposed in the path of the incoming light traveling along the input path so as to allow the incoming light to pass through the body of transparent material and travel along the first transmitted path.

In some embodiments the first transparent material is silica and the second transparent material is an elastomeric material.

In some embodiment the incoming path, the first and second transmitted paths, and the first, second, and third reflected paths are defined by waveguide segments in a planar waveguide structure. WADEs according to different embodiments of the invention are readily incorporated in a variety of configurable wavelength add drop multiplexers.

A further understanding of the nature and advantages of the present invention may be realized by reference to the remaining portions of the specification and the drawings.

BRIEF DESCRIPTION OF THE DRAWINGS

FIGS. 3A and 3B are schematic plan views showing the operation of the WADE;

DESCRIPTION OF THE SPECIFIC EMBODIMENTS

Basic Wavelength Add Drop Element Architecture and Operation

Figure 1:
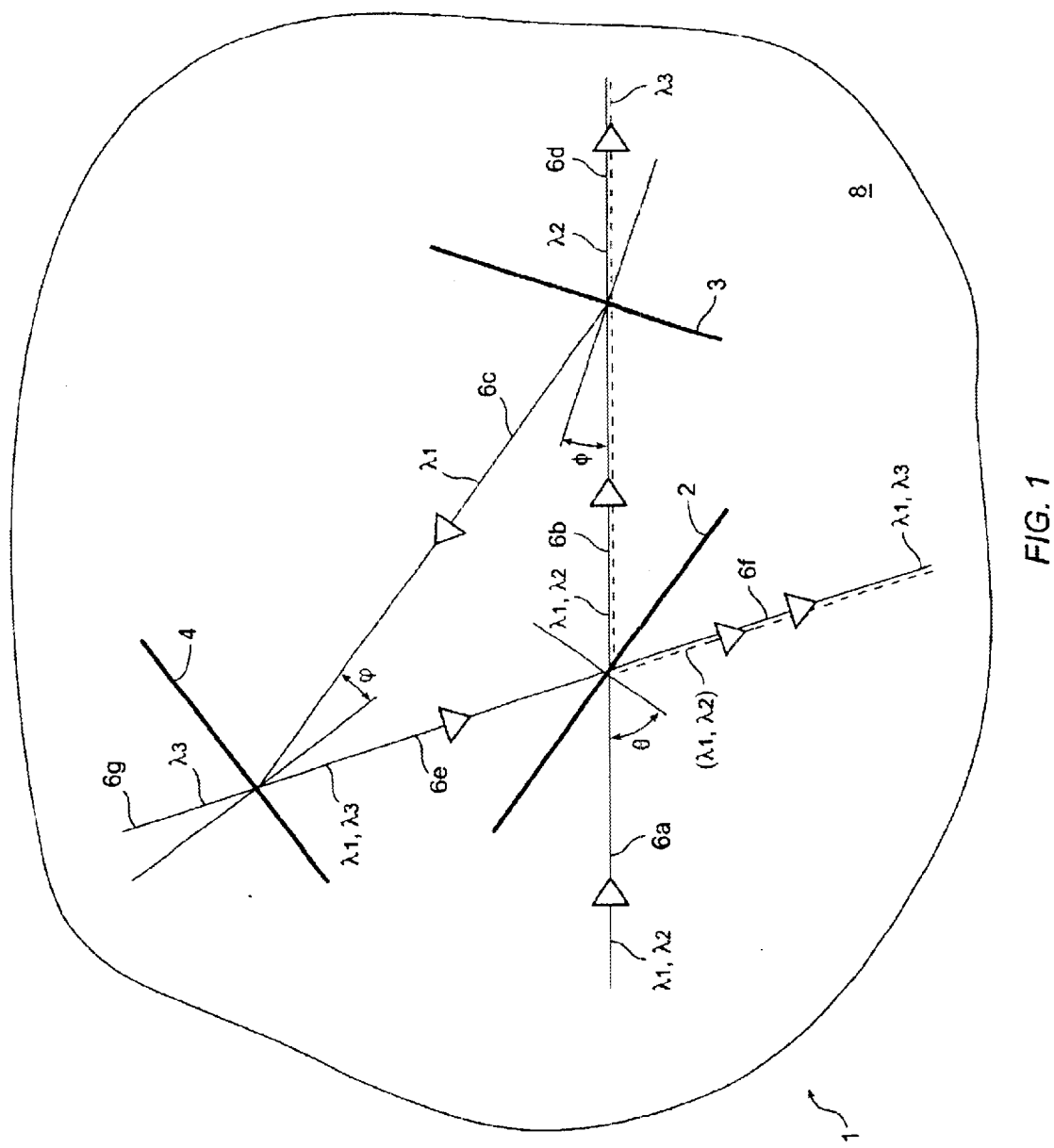
FIG. 1 is a schematic plan view of an embodiment of a basic wavelength add drop element (WADE)

FIG. 1 is a schematic plan view of an embodiment of a wavelength add drop element (WADE) 1 according to a multiplexing embodiment of the present invention. WADE 1 includes first, second, and third reflectors 2, 3, 4. The first reflector is a configurable reflector having a first state in which incident light is transmitted through the reflector and a second state in which incident light is reflected. As shown in FIG. 1, a first incoming light arbitrarily shown as entering from the left includes at least first and second wavelengths ($\lambda 1$ and $\lambda 2$) traveling along a first input path 6a is incident upon the first reflector at an angle $\theta$ with respect to a surface normal of the first reflector.

If the first reflector is in its first state the first incoming light is transmitted through the reflector onto a first transmitted path 6b. The light subsequent to transmittal by the first reflector is incident upon the second reflector at an angle $\phi$ with respect to a surface normal of the second reflector. The second reflector, which is a wavelength-selective reflector splits the light into its component wavelengths. As shown in FIG. 1, $\lambda 1$ is reflected by the second reflector onto a second reflected path 6c and $\lambda 2$ is transmitted by the second reflector onto a second transmitted path 6d. Subsequent to transmittance of $\lambda 2$ by the second reflector, $\lambda 2$ exits the WADE. $\lambda 1$ subsequent to reflection from the second reflector is incident upon the third reflector at an angle $\phi$ with respect to a surface normal of the third reflector. In a preferred embodiment $\Phi$ and $\phi$ are equal. The third reflector reflects light of at least the first wavelength. As shown in FIG. 1, $\lambda 1$ is reflected by the third reflector onto a third reflected path 6e. Subsequent to reflection from the third reflector $\lambda 1$ passes through the first reflector and thereafter exits the WADE.

If the first reflector is in its second state the first incoming light is reflected onto a first reflected path 6f (shown as dashed). Subsequent to reflection from the first reflector the light exits the WADE. In a preferred embodiment the first reflected path and the third reflected path are approximately collinear.

In some applications a second input path 6g is of use for routing a second incoming light through the WADE. The second incoming light has at least a third wavelength $\lambda 3$ and is transmitted through the third reflector and continuous onto the third reflected path. If the first reflector is in its first state the second incoming light is transmitted through the first reflector and continuous on the first reflected path and exits the WADE multiplexed with $\lambda 1$. If the first reflector is in its second state the second incoming light is deflected onto the first transmitted (shown as dashed for $\lambda 3$) and is further transmitted through the second reflector onto the second transmitted path (shown as dashed for $\lambda 3$) and exits the WADE.

In a preferred embodiment the incoming light traveling on the first input path is in a body of material 8 that has a refractive index greater than 1. In a further preferred embodiment the first reflector in its second state provides for the first body of material to be adjacent a medium having a lower index of refraction than the first body of material. As such the first reflector provides for deflection of the incoming signal through total internal reflection for $\theta$ at or above the critical angle. In a specific embodiment when the first reflector is in its second state the medium adjacent the first body of material is air, and when the first reflector is in its first state the medium adjacent the first body of material has an index of refraction equal to the first body of material. Further specific embodiments of the invention are discussed below.

Specific Embodiment of Wavelength Add Drop Elements and Operative States

Figure 2:
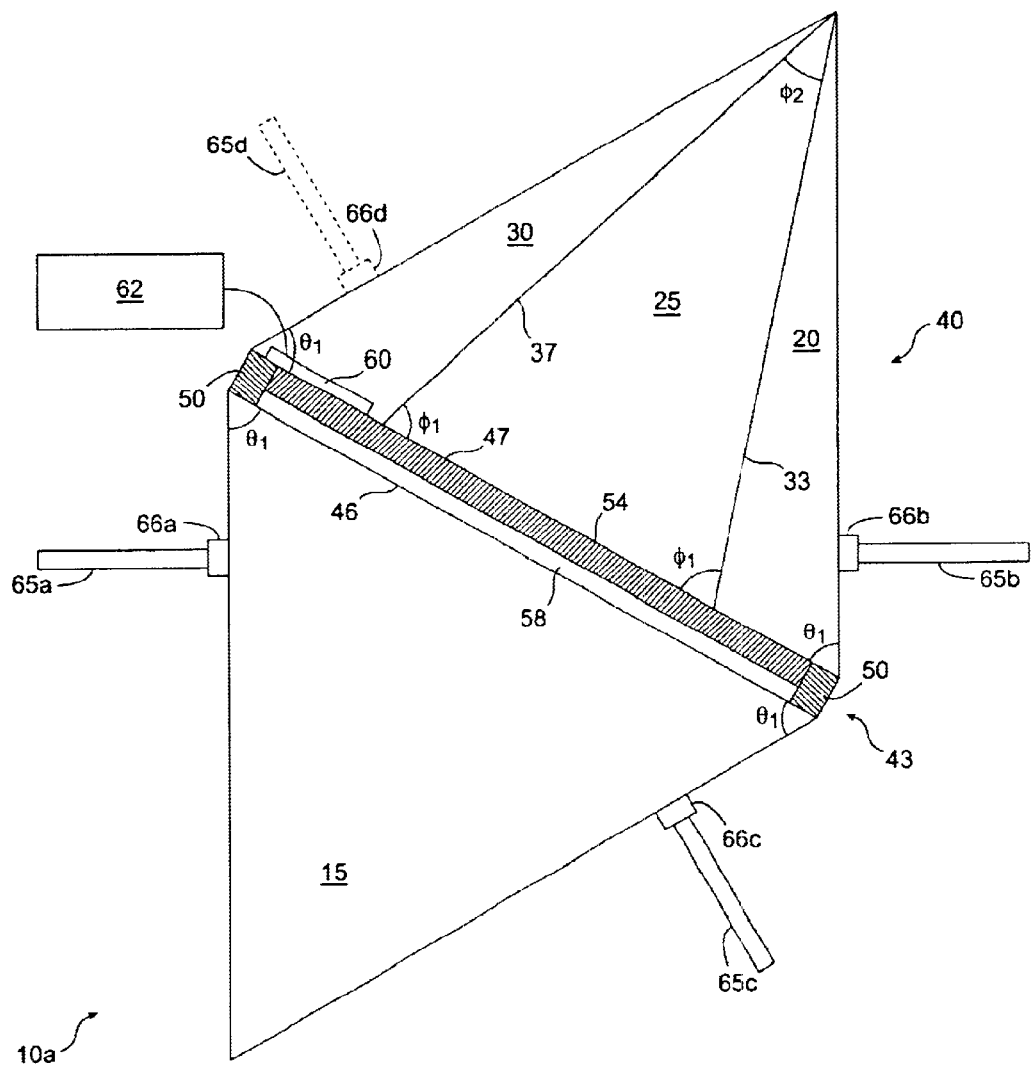
FIG. 2 is a schematic plan view of a basic (WADE) where the first transparent material is a plurality of prisms.

FIG. 2 is a schematic plan view of a specific embodiment of a wavelength add drop element (WADE) 10a. WADE 10a includes prisms 15, 20, 25, and 30 for routing incoming and outgoing optical signals. Disposed respectively between prisms 20 and 25 and between prisms 25 and 30 are reflectors 33 and 37. In some embodiments the reflectors include selectively reflector such as wavelength-selective filters. Such wavelength-selective filters may be holographic filters, interference filters (e.g., band pass filters) or other suitable filtering devices. In a specific embodiment the wavelength-selective filters are thin film coatings applied directly to the prisms. Such thin film coatings are typically multi-layer dielectric coatings that can selectively reflect a given wavelength or wavelengths and/or selectively transmit a given wavelength or wavelengths. Such multi-layer coatings are typically comprised of sets of dielectric double layers but may be of higher order. The dielectric double layers have one layer with a higher index of refraction than the other layer. To maximize reflection the layer having the higher index of refraction is adjacent the medium from which optical signals are received and the lower index layer is adjacent a substrate (e.g., prism 20, 25 or 30). To minimize reflection (maximize transmission) the dielectric layer having a lower index of refraction is adjacent the medium from which optical signal are received and the higher index layer is adjacent the substrate (e.g., prism 20, 25, or 30). Moreover, to further maximize or minimize reflection, such layers typically have thicknesses of a quarter or half wavelength of the light to be reflected or transmitted; the thicknesses of the various layers cause the reflected wavelengths to be either in phase (to enhance reflection) or 180° degrees out of phase (to minimize reflection). The use of such thin film coatings for wavelength filtering and reflectivity is well known to those skilled in the art.

Prisms 20, 25 and 30 with included reflectors 33 and 37 form a routing element 40 having an isosceles triangular shape. Prism 15 also has an isosceles triangular shape. In a particular embodiment routing element 40 and prism 15 have equilateral shapes. Moreover, if routing element 40 and prism 15 have equilateral dimensions, then the interior angles $\Phi 1$ of prism 25 are 75° and angle $\Phi 2$ is 30°. In a further embodiment angle $\theta 1$ is related to $\Phi 1$ via $\Phi 1 = \theta 1/2 + 45°$. These angular relationships will be further discussed below.

Routing element 40 and prism 15 define a gap 43. The gap is preferably about 100 $\mu$m to 200 $\mu$m wide (however other widths are of use). The gap has a front surface 46 bounded by prism 15 and a back surface 47 bounded by routing element 40, and the sides of the gap are bounded by spacer elements 50 (shown with vertical hatching marks). A thermal expansion element (TEE) 54 (shown with horizontal hatching marks) is disposed in the gap 43 between routing element 40 and prism 15. The TEE is a body of transparent solid material having a contracted state at a first temperature T(low) and an expanded state at a second temperature T(high). When the TEE is in its contracted state, it defines an air gap 58 in the path of light traveling through prisms 15 along a first input path. When the TEE is in its expanded state, it fills the air gap. The TEE preferably has an index of refraction that matches the index of refraction of prisms 15, 20, 25 and 30. The TEE is attached to routing element 40 such that optical coupling occurs between the TEE and routing element. Attachment may be achieved by refractive index matching glues, mechanically applied pressure, mechanical capture, or by other appropriate means.

Temperature control of the TEE and hence its expansion or contraction is suitably controlled by a temperature control element 60, (having an associated temperature controller 62). In most embodiments, the temperature control element is a resistive heater, so that the TEE is caused to switch from its contracted state to its expanded state by application of current to the heater. However, in other embodiments, the temperature control element could be a thermoelectric cooler element, so that the TEE is caused to switch from its expanded state to its contracted state by application of current to the cooler. It is also possible to provide a heater and cooler for temperature control. The temperature control element may also be an electromagnetic wave radiation source, the radiation from which is absorbed by the TEE causing it to switch from its contracted state to its expanded state. The temperature controller 62 for a radiation source, may be any device to regulate the radiation power and/or radiation energy emanating from the radiation source.

A first waveguide segment 65a serves as a first input and receives optical signals from the left as shown in FIG. 2. The signals are received from other non-pictured optical devices, such as other WADEs, optical multiplexers and networks, signal generators, or the like. The input waveguides in turn deliver the optical signals to prism 15. A second waveguide segment 65c serves as a first output and receives optical signals from prism 15. A third waveguide segment 65b serves as a second output and receives optical signals from routing element 40. The output waveguide segments 65b and 65c deliver optical signals to other optical devices such as those mentioned previously. In some embodiments a secondary input path is useful and a fourth waveguide segment 65d is provided for delivering optical signals to routing element 40. As a second input path is not required for some wavelength division multiplexing functions (discussed in detail below) waveguide 65d is shown in phantom.

Each of the waveguide segments may be an optical fiber, monolithic planar waveguide, or other suitable waveguide material. In some embodiments, particularly those having waveguide segments that are optical fibers, collimating devices 66a, 66b, 66c and 66d may be disposed between the respective waveguide segments and respective prisms as shown in FIG. 2. Such collimating devices are preferably gradient index of refraction (GRIN) lenses but may be spherical dielectric lenses or any other collimating devices. A GRIN lens is typically a transparent, cylindrical device formed from glass or other transparent medium having a parabolically varying index of refraction along a radius extending from the central axis of the cylinder to the surface of the cylinder. Typically the refractive index along the central axis is higher than the index of refraction away from the central axis. While, FIG. 2 show the waveguide segments and collimators as discrete elements, they may be fabricated as a single structure.

FIGS. 3A and 3B are detailed schematic plan views of the operative states of WADE 10a. The WADE shown in FIGS. 3A and 3B is in the same orientation as the WADE in FIGS. 1 and 2. As shown in FIG. 3A, when the TEE is in its contracted state, it defines air gap 58 in the path of light entering from the left on the first input path. For example purposes it is assumed the entering light is composed of two wavelengths, $\lambda 1$ and $\lambda 2$. Contraction of the TEE causes the entering light to be deflected through total internal reflection onto a first reflected path in prism 15, such that both $\lambda 1$ and $\lambda 2$ are deflected downwardly and to the right as shown in FIG. 3A. In a preferred embodiment the first input path is at about 60° or greater from a normal of surface 46. The air gap is of a width such that evanescent waves entering the air gap are minimally coupled to the TEE so as to provide a desirable low level of insertion loss and crosstalk. Though evanescent waves are well understood by those of ordinary skill in the art, they are further discussed below.

As shown in FIG. 3B, when the TEE is in its expanded state, it fills the air gap, thereby allowing the light to pass through the TEE into prism 25 on a first transmission path. The TEE material preferably has an index of refraction that matches the refractive index of the prisms. Thus when the TEE is in its expanded state, insertion loss and crosstalk from Fresnel reflections arising from refractive index mismatch are effectively minimized. In the embodiment shown in FIG. 3B, reflectors 33 and 37 include wavelength-selective filters. Thus light traversing the first transmission path is split at reflector 33, such that $\lambda 1$ is deflected by the reflector onto a second reflected path in prism 25 and $\lambda 2$ passes through the reflector onto a second transmission path into prism 20 (where it can exit via waveguide segment 65*b*). $\lambda 1$ is subsequently deflected by reflector 37 onto a third reflected path and passes back through the TEE and into prism 15 on a so called "folded path" (where it can exit via waveguide segment 65*c*). The above is an operative description of the divisional mode or demultiplexing mode of the WADE. The WADE can also be used in a combinational mode or multiplexing mode.

In a multiplexing mode, $\lambda 1$ and $\lambda 2$ enter the WADE on waveguide segments 65*c* and 65*b* respectively, and are combined onto waveguide segment 65*a*. More specifically, $\lambda 1$ enters the WADE on waveguide segment 65*c* and traverses both prism 15 and the TEE into prism 25. $\lambda 1$ is subsequently reflected at reflector 37, and is further reflected at reflector 33; $\lambda 1$ again traverses the TEE to reenter prism 15 and exits the WADE on waveguide segment 65*a*. $\lambda 2$ enters the WADE on waveguide segment 65*b*, traverses prism 20, and is transmitted by reflector 33 into prism 25. $\lambda 2$ is subsequently transmitted by the TEE into prism 25 and exits the WADE on waveguide segment 65*a* in combination with $\lambda 1$. As in the demultiplexing mode, the WADE 10 provides for a folded path for $\lambda 1$ in the demultiplexing mode.

The use of a folded path provides for multiple functional benefits in the present invention. It is desirable that the WADEs of the present invention have low crosstalk. That is a substantial portion of light should be directed to intended channels and substantially none of the light should be directed into unintended channels. To achieve low crosstalk it is desirable that reflection from a first medium having a high index of refraction to a second medium having a lower index of refraction be at about the critical angle or above (such as the reflection of $\lambda 1$ and $\lambda 2$ and the prism-air gap interface 46). To achieve low crosstalk at the prism-reflector interfaces (e.g., prism 25 and reflectors 33 and 37 interfaces) it is desirable that light at the interfaces be at near normal incidence. Thus the various polarization components of the incident beam will be minimally transmitted by the reflector, i.e., the incident beam will be substantially reflected.

The use of a folded path through the WADE provides for both of the above recited features, low crosstalk generated at surface 46 and at reflectors 33 and 37. First, light incident on surface 46 can be maintained at or above the critical angle by appropriately selecting the geometry of the various prisms.

An embodiment of the WADE providing for reflection at surface 46 at or above the critical angle (i.e., total internal reflection) includes prism 15 and routing element 40 being equilateral triangles. Other prism geometries also provide for total internal reflection at surface 46, and will be discussed below in combination with further benefits provided by such geometries.

Second, when the TEE is in its expanded state, light incident upon reflectors 33 and 37 can be maintained at a small angle of deviation from normal incidence by appropriately selecting the angle of incidence of light with respect to the reflectors. An angle of incidence of $\Phi=(90-\theta)/2$ generally provides for acceptable levels of insertion loss and crosstalk. Angular deviation from normal is limited by a desire that the total insertion loss and crosstalk though a WADE of less than about a –50 db attenuation (higher levels of insertion loss may acceptable in some application) and is further limited by the angle of incidence $\theta$ (FIG. 1). For most embodiments of the WADE, as $\theta$ is increased $\Phi$ decreases.

In some embodiments of the WADE, a continuous set of prism geometries provide for both signal reflections at surface 46 at or above the critical angle, and near normal incidence signal propagation at reflectors 33 and 37. One set of prism geometries for prisms 15, 20, 25 and 30 providing such features have interior angles interrelated according to $\Phi 1=45+\theta 1/2$. This angular relationship is derived from a constraint on the second reflected path being approximately parallel to surfaces 46 and 47, as shown in FIG. 3B. This relationship provides further benefits in that the first and third reflected paths are approximately collinear. Although, it is preferred that the various optical path, such as the first and third reflected path be collinear, the paths may be displaced from one another or may be non-parallel. The deviation from collinearity is generally limited to the capability of a waveguide segment to collect the displaced or non-parallel beams, or of a collimator to focus the various beams onto a waveguide segment. While it is preferred that the various paths be collinear practical manufacturing tolerances are provided for.

In a further preferred embodiment $\theta 1=\theta$. As shown in FIG. 1, $\theta$ is the angle of incidence of the first incoming signal with respect to surface 46. This embodiment provides that the first incoming signal is normally incident at surfaces 67*a*, 67*b*, 67*c*, and 67*d*.

FIG. 3B shows further features provided by the WADE of the present invention; a third wavelength $\lambda 3$ can be multiplexed with $\lambda 1$. More specifically, $\lambda 3$ enters the WADE on a second input path via Waveguide segment 65*d* and is further transmitted through prism 30 and reflectors 37 into prism 25. Subsequently, $\lambda 3$ is transmitted by the TEE into prism 30 and is further transmitted into waveguide segment 65*c* to be combined/multiplexed with $\lambda 1$.

As shown in FIG. 3B, the TEE has as relatively flat profile parallel to surfaces 46 and 47, but to further enhance optical coupling between prism 15 and the TEE, the TEE may have a rounded profile. A rounded profile provides that the TEE makes first optical contact with prism 15 at about the area through which the optical signals pass when the TEE is in its expanded state. Such a profile further provides that a minimal amount of air is trapped between the TEE and prism as the TEE expands. In other words, as the TEE makes contact with prism 15 at a central area, air is pushed from the contact area by the expanding TEE and escapes being trapped at the contact area.

FIGS. 3A and 3B show that the WADE 10*a* of the present invention can be used as a configurable add drop multiplexer such that individual wavelengths of a trunk line signal may or may not be dropped at an optical network node. For example, if the TEE is in its contracted state no wavelengths of a trunk line signal traversing from waveguide segment 65*a* to 65*b* are dropped onto waveguide segment 65*b*. Alternatively, wavelengths can be dropped from a trunk line signal if the TEE is in it expanded state. The configurability the present invention provide for fast low cost attachment to an optical network when a node is ready for use. Such nodes may include end user sites or further optical networks. Such configurability also provides for cost saving in the installation of new optical networks and in existing networks as costly regeneration devices need not be attached at drop nodes as is required by known add drop multiplexers that are not configurable.

Figure 4:
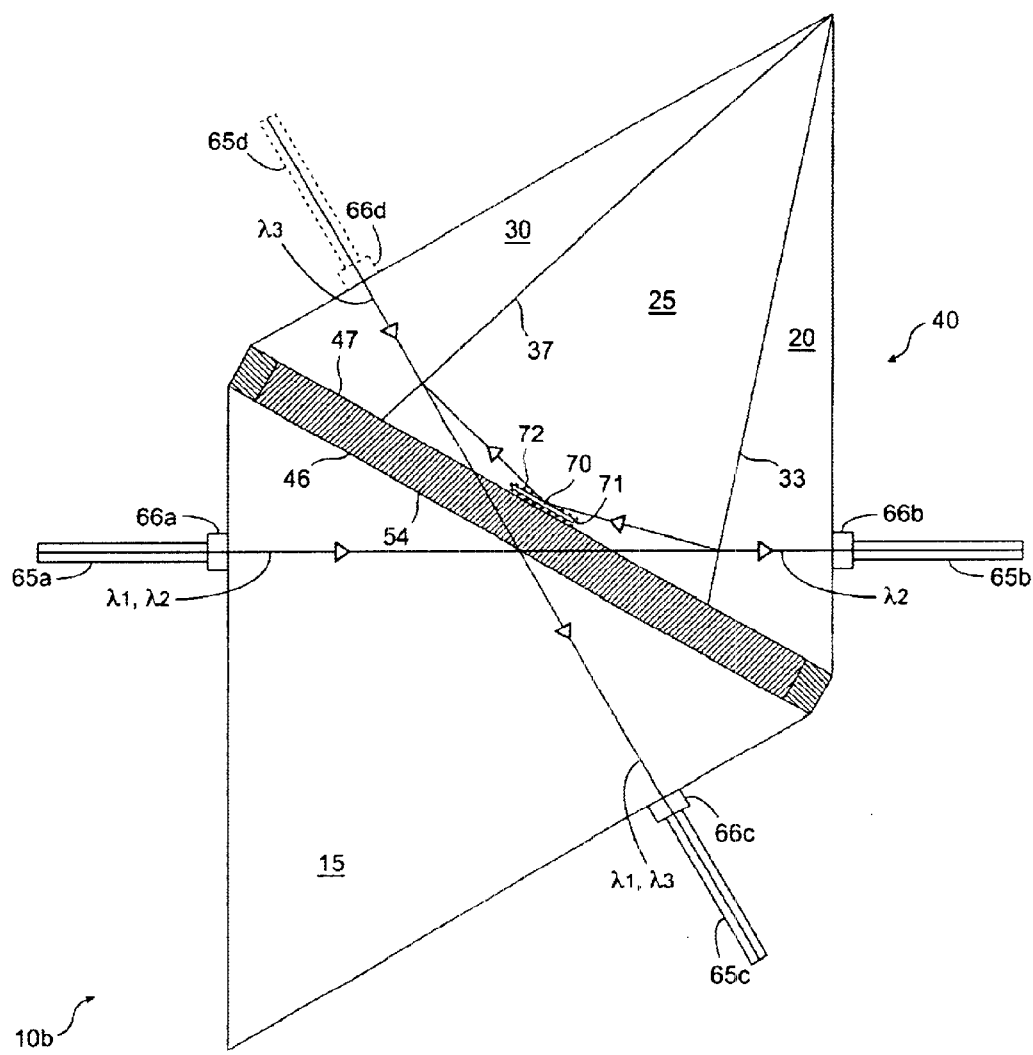
FIG. 4 is a schematic plan view of a basic WADE having an auxiliary reflector.

FIG. 4 is a schematic plan view of an alternative embodiment of a WADE 10b having a reflector 70 disposed between reflectors 33 and 37. The reflector is parallel to surfaces 46 and 47. As shown in FIG. 4, reflector 70 is disposed in a recess or aperture 71 of prism 25. The previous numbering scheme is adopted for corresponding elements previously described and shown in FIGS. 2, 3A and 3B. In other embodiments, the reflector may be disposed in trench 43 such that the reflecting surface 72 is coplanar with surface 47. In yet other embodiment reflector 70 is a thin film reflective coating applied to surface 47. Reflector 70 reflects $\lambda 1$ received from reflector 33 to reflector 37. The use of reflector 70 provides for near normal incidence of the incoming beam with respect to reflectors 33 and 37 as interior angles 43 are decreased to reflect $\lambda 1$ to reflector 70. Thus the various polarizations of the beam deflected at reflectors 33 and 37 have relatively small transmission components; thus lowering crosstalk and insertion losses.

Figure 5:
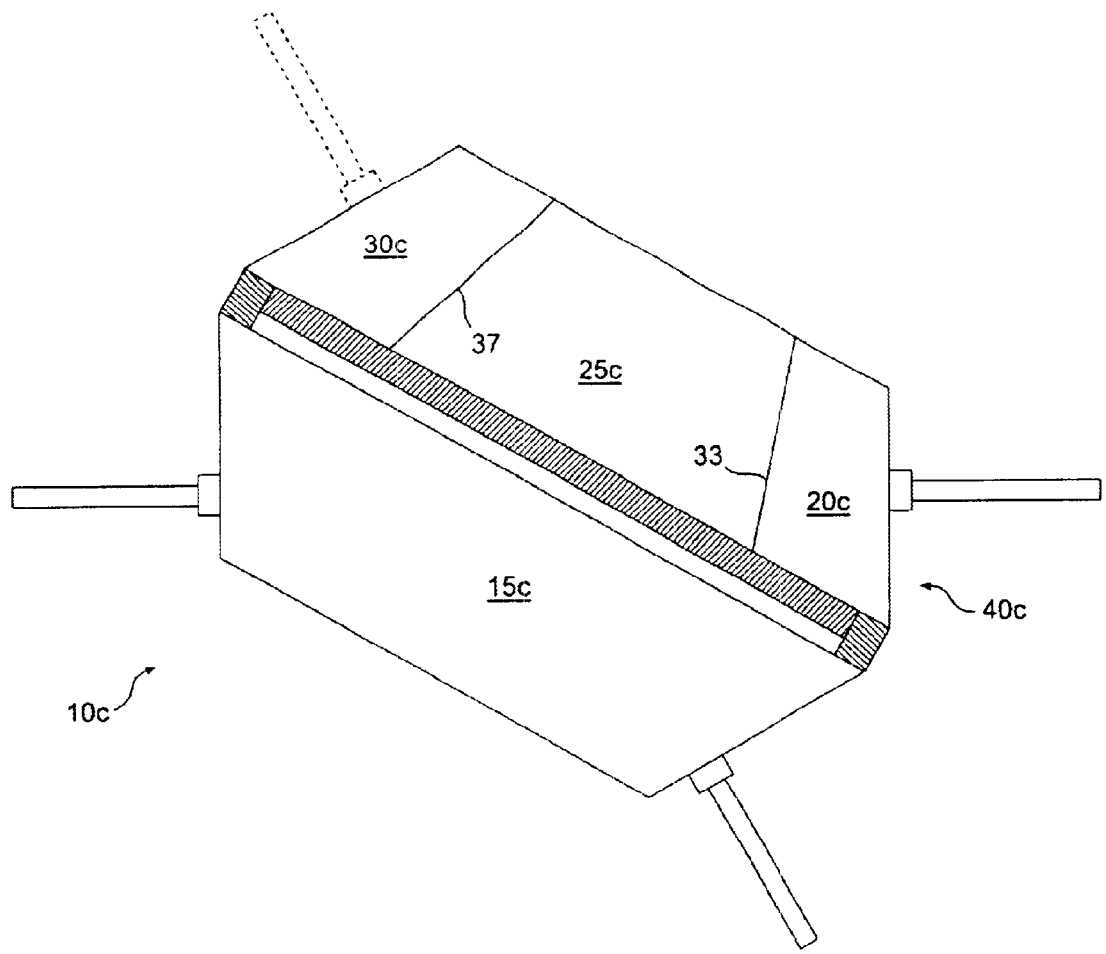
FIG. 5 is a schematic plan view of a basic WADE having truncated prisms.

FIG. 5 is a schematic plan view of an alternative embodiment of a WADE 10c having prisms 15c, 20c, 25c, and 30c that do not have triangular shapes. Prism 15c and routing element 40c comprised of prisms 20c, 25c, 30c and reflectors 33 and 37 both have trapezoidal shapes and as such provide for a relatively smaller device than previously described embodiment while providing the same functionality.

Figure 6:
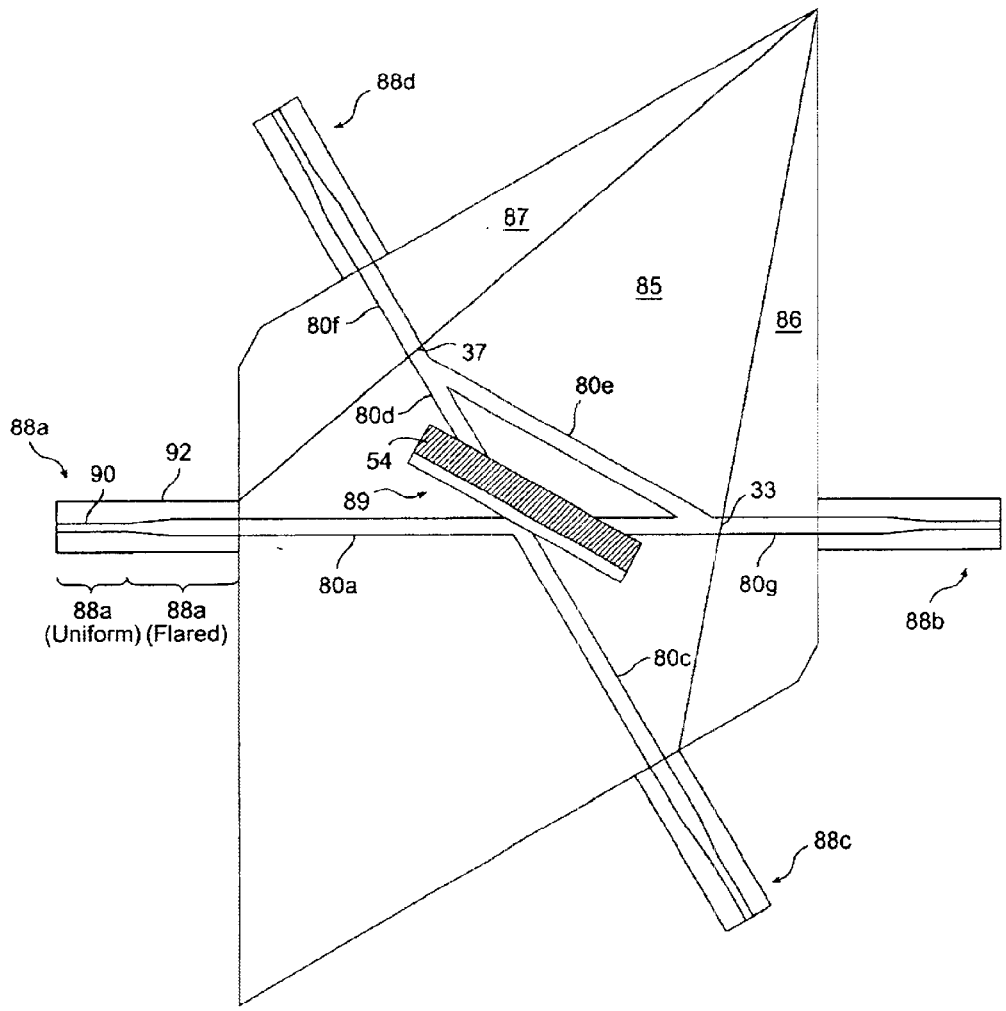
FIG. 6 is a schematic plan view of a basic WADE having planar waveguides.

FIG. 6 is a schematic plan view of a WADE 10d according to an alternative add drop embodiment of the present invention. The WADE has the functional properties of previously described embodiments. In this embodiment, waveguide segments 80a, 80b, 80c, 80d, 80e, 80f and 80g are defined by intersecting planar waveguides formed in their respective planar waveguide structures 85, 86 and 87. The planar waveguide structures can be manufactured in accordance with known technologies. For example, a typical construction has a layer of silicon dioxide (silica) formed on a silicon substrate. Regions of the silica corresponding to desired waveguides are doped to provide an increased refractive index relative to the remaining portions of the silica. This can be accomplished by known semiconductor processing techniques for creating buried structures.

Thin film reflective coatings 33 and 37 are applied respectively to planar waveguide structures 86 and 87 or are applied to planar waveguide structure 85. The respective reflective coatings cover the area at which waveguide structure 80b, 80e, and 80g intersect and in the region were waveguide structure 80d, 80e, and 80f intersect. In a preferred embodiment the thin film reflective coatings are selectively reflectors such as wavelength selective filters. Such selectively reflective coating provide for various wavelengths of an incoming beam to be split into its component wavelengths exiting the WADE along the various optical fibers. The optical path by which the various wavelengths traverse the WADE 10d are comparable those previously described and as shown in FIGS. 3A and 3B.

A diagonal trench 89 is formed in planar waveguide structure 85 and intersects the crossed waveguides where waveguide segments 80a, 80b, 80f, and 80g intersect. A thermal expansion element (TEE) 54 (shown with horizontal hatching marks) is disposed in the trench. Light is communicated to and from waveguide segments 80a, 80b, 80c, and 80d via respective optical fibers 88a, 88b, 88c, and 88d, each optical fiber is shown with a central waveguiding core 90 surrounded by a lower-index-of-refraction cladding 92. The drawing is also simplified in the sense that the mechanism for aligning the fiber ends to the ends of the waveguide segments is not shown. In a typical embodiment, the silicon substrate would extend outwardly beyond the outer periphery of the silica layer that includes the waveguide segments. V-grooves would be formed in the silicon substrate by lithographic processes that would align the grooves with the waveguide segments, and the fiber ends would be bonded into the V-grooves. This could be accomplished, for example, by metallizing the fibers and the V-grooves and soldering the metallized fibers in the metallized V-grooves.

According to a preferred configuration, these fibers have a special flared-core configuration. The particular structure of fiber 88a will be described, it being understood that the other fibers 88b, 88b, and 88d preferably have corresponding structure. The fiber has circular symmetry, with a typical waveguide diameter for a single-mode waveguide being about 10 $\mu$m. The core 90 may have a refractive index that is constant across its diameter or it may have a graded index with, for example, a parabolic variation as a function of radial distance from the fiber axis (with the maximum index being along the axis).

However, in specific embodiments, the fiber is fabricated so that the diameter is uniform over a portion of its length, but which diameter gradually (adiabatically) expands or flares over a portion of its length so as to be at a larger diameter proximate and adjacent substrate 85. The uniform and flared portions of the fiber are designated 88a(uniform) and 88a(flared), respectively. The maximally expanded core diameter is typically a factor of 2–4 times the uniform normal core diameter. The maximally expanded diameter preferably matches the transverse dimension of the waveguides formed in the substrate 85. A fiber segment with a flared core can be achieved by heating a portion of an optical fiber, which causes the dopants (e.g., germanium) that provide the increased index of refraction of the core to diffuse outwardly into the cladding.

The flaring of the core diameter is sufficiently gradual that the single-mode light propagation in the fiber remains single moded in the expanded core portion, and is single mode in the planar waveguide segments. This construction allows the waveguide segments to be wider, which allows a wider trench, which is advantageous for one or more reasons. A wider trench can ease some manufacturing tolerances and allow a thicker TEE. The thicker the body of thermal expansion material in the TEE, the lower the required temperature differential to provide a given thickness of air gap. The thicker the air gap, the lower the leakage of the evanescent wave. Thus, it is possible to achieve a desired low level of insertion loss and crosstalk with a more modest temperature differential. Further, the wider waveguide dimension can reduce or eliminate the need for collimators in the design.

It should be realized that while the use of the larger diameter relaxes the alignment tolerance in the x-y-z positioning of the optical fiber's ends with respect to the waveguide segments, the angular tolerance becomes more demanding. This can be addressed by aligning the optical fibers by bonding them into V-grooves formed on the surface of the silicon substrate as discussed above.

In alternative embodiment the waveguide segments 80a, 80b, 80c, and 80d may be flared while the cores 90 of optical fibers 88*a*, 88*b*, 88*c*, and 88*d* are of constant diameter. The transverse dimension of the flared section of the waveguide segments is about 2–4 times the transverse dimension of the unflared section. In such an embodiment the transverse dimension of the cores of the optical fiber at the edge of the planar waveguide structure match the diameter of waveguide segments 80*a*, 80*b*, 80*c*, and 80*d*.

Figure 7:
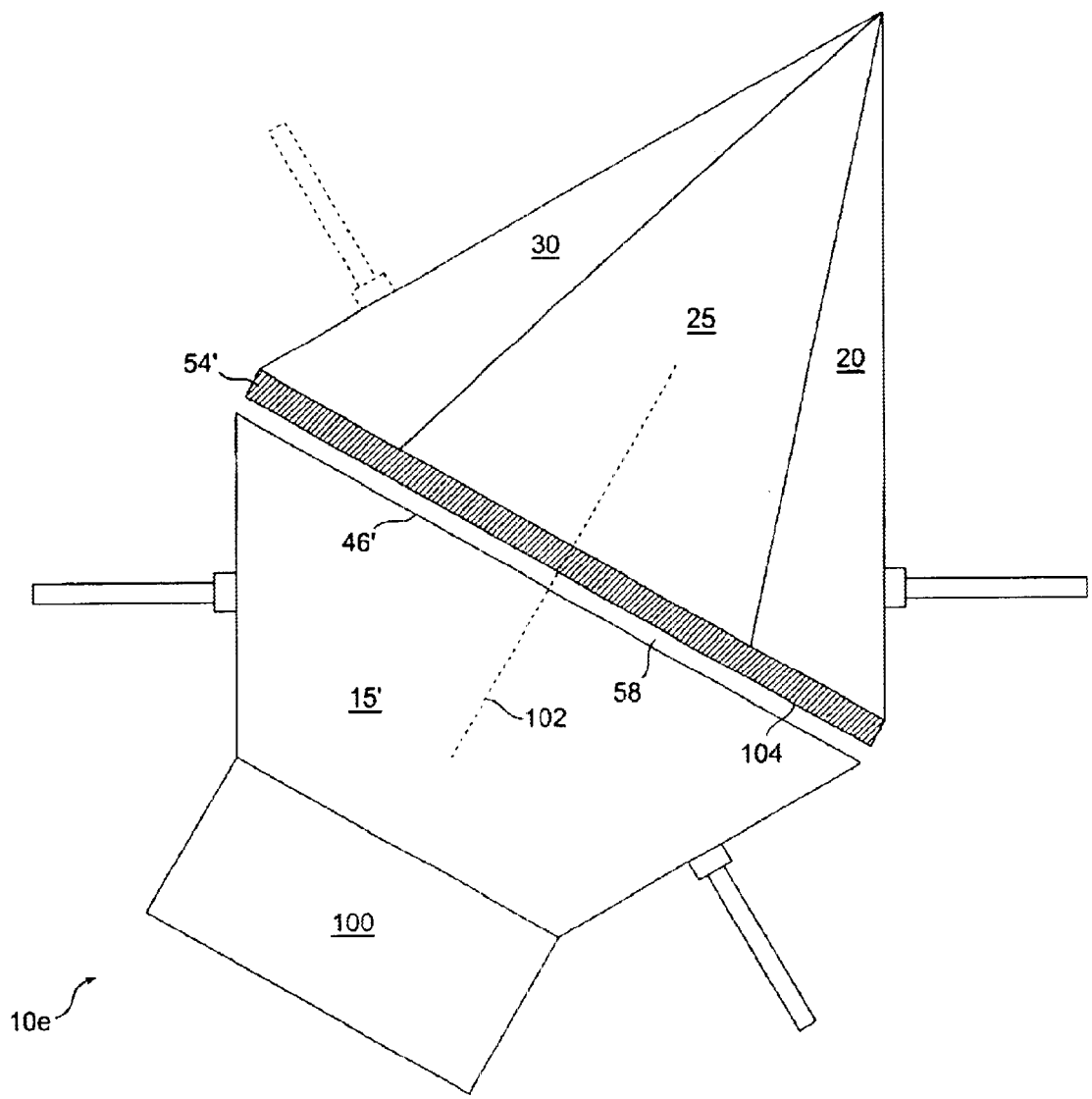
FIG. 7 is a schematic plan view of a basic WADE with a pushing mechanism.

Mechanical Actuation for Optical Coupling between Elastomeric Materials and Prisms FIG. 7 is a schematic plan view of an alternative embodiment of a WADE 10*e* having a pushing device 100 to effect optical coupling between prism 15' and an elastic element 54'. The pushing device has a retracted state and an extended state. The pushing device coupled to prism 15' moves the prism parallel to a central axis 102. In the retracted state of the pushing device an air gap 58 is disposed between prism 15' and the elastic element. In the extended state of the pushing device prism 15' and the elastic element are optically coupled. To align surface 46 with surface 104 and hence ensure optical coupling between the prism and elastic material the pushing device may provide for linear motion of prism 15' along the central axis or prism 15' may have associated guiding devices or structures (not pictured) such as a trench or slot in which the prism is placed for travel parallel to the central axis 102. Pushing device 100 may be a piezoelectric, solenoid or other suitable material or mechanism.

In a preferred embodiment the elastic element has a rounded profile. A rounded profile provides that the elastic element makes first optical contact with prism 15' at about the area through which the optical signals pass. The contact area expands from this region as the pushing element transitions from its retracted state to its expanded state. Such a profile further provides that a minimal amount of air is trapped between the elastic element and prism as the prism is pushed toward the elastic element. More specifically, as the contract area between the elastic element and prism 15' radially expands air does not become trapped as it is pushed from the contract area by the elastic element.

Further, to effectively minimize insertion losses and crosstalk the elastic material has an index of refraction that matches the indices of the various prisms. Matching the index of refraction servers to eliminate Fresnel reflections at the elastic material-prisms interfaces.

Figure 8B:
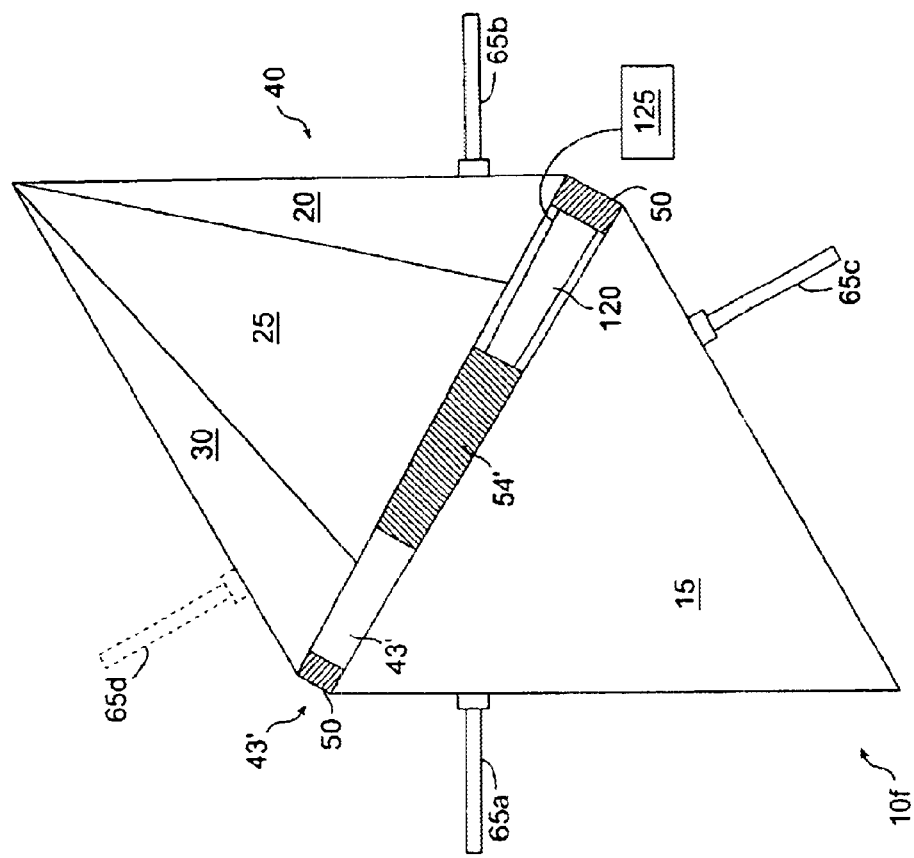
FIGS. 8A, 8B, and 8C are schematic plan views of a basic WADE with a pushing mechanism coupled to an elastic element.
Figure 8A:
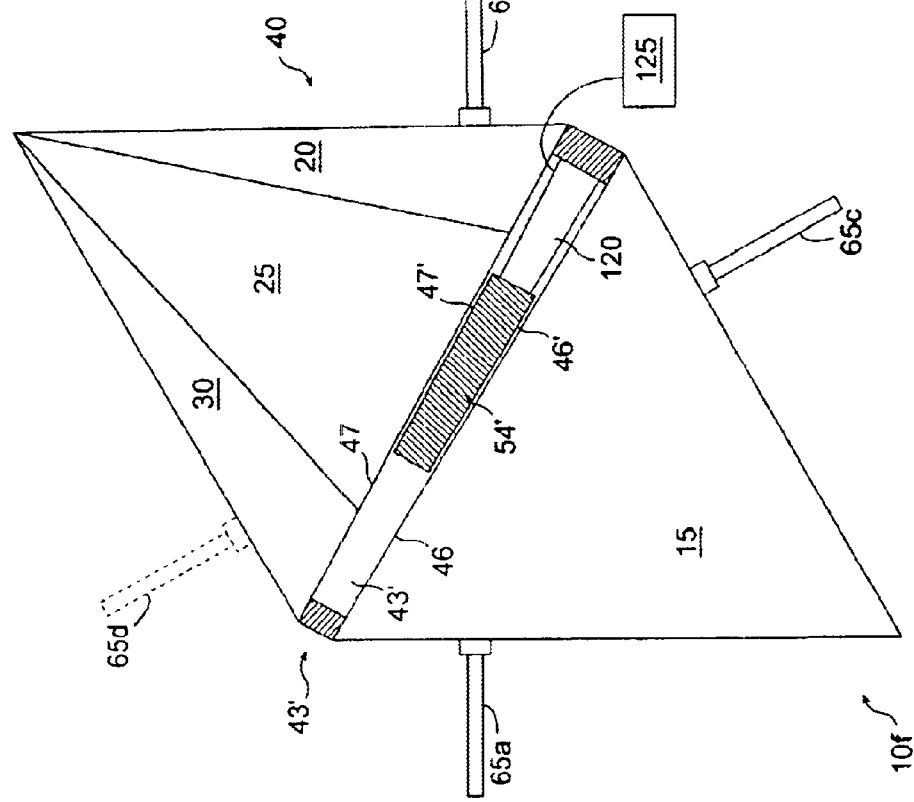

FIGS. 8A and 8B are schematic plan views of an alternative embodiment of a WADE 10*f* of the present invention having an elastic element 54' coupled to a pushing device 120. In FIG. 8A the elastic element 54' is shown to have a wedge shape that matches the profile of a wedge shaped gap 43' bounded by prism 15 and routing element 40. The pushing device having retracted and expanded states moves the elastic element along the length of the wedge shaped gap. The pushing device in its retracted state causes an air gap to be disposed in the path of light traveling along a first input path. The light is deflected onto a first reflected path through total internal reflection at the prism-air gap interface 46. This optical path has been previously described in detail. As shown in FIG. 8B, the pushing device upon expansion moves the elastic element into optical contact with both prism 15 and routing element 40. As a result, incoming optical signals pass through prism 15, through the elastic element and into routing element 40. Further, the wavelengths of the optical signal either 1) traverse the folded path to waveguide segment 65*c* or 2) pass to waveguide segment 65*b*. Both paths have been previously described in detail.

To further enhance optical coupling between the elastic element and the various prisms (i.e., to prevent air entrapment), either or both sets of elastic element surfaces 46' and 47' or prisms surfaces 46 and 47 may be coated with a layer of material to prevent sticking of the elastic material to prisms surfaces 46 and 47. In a preferred embodiment the coating is a monolayer of polytetrafluoroethylene.

Figure 8C:
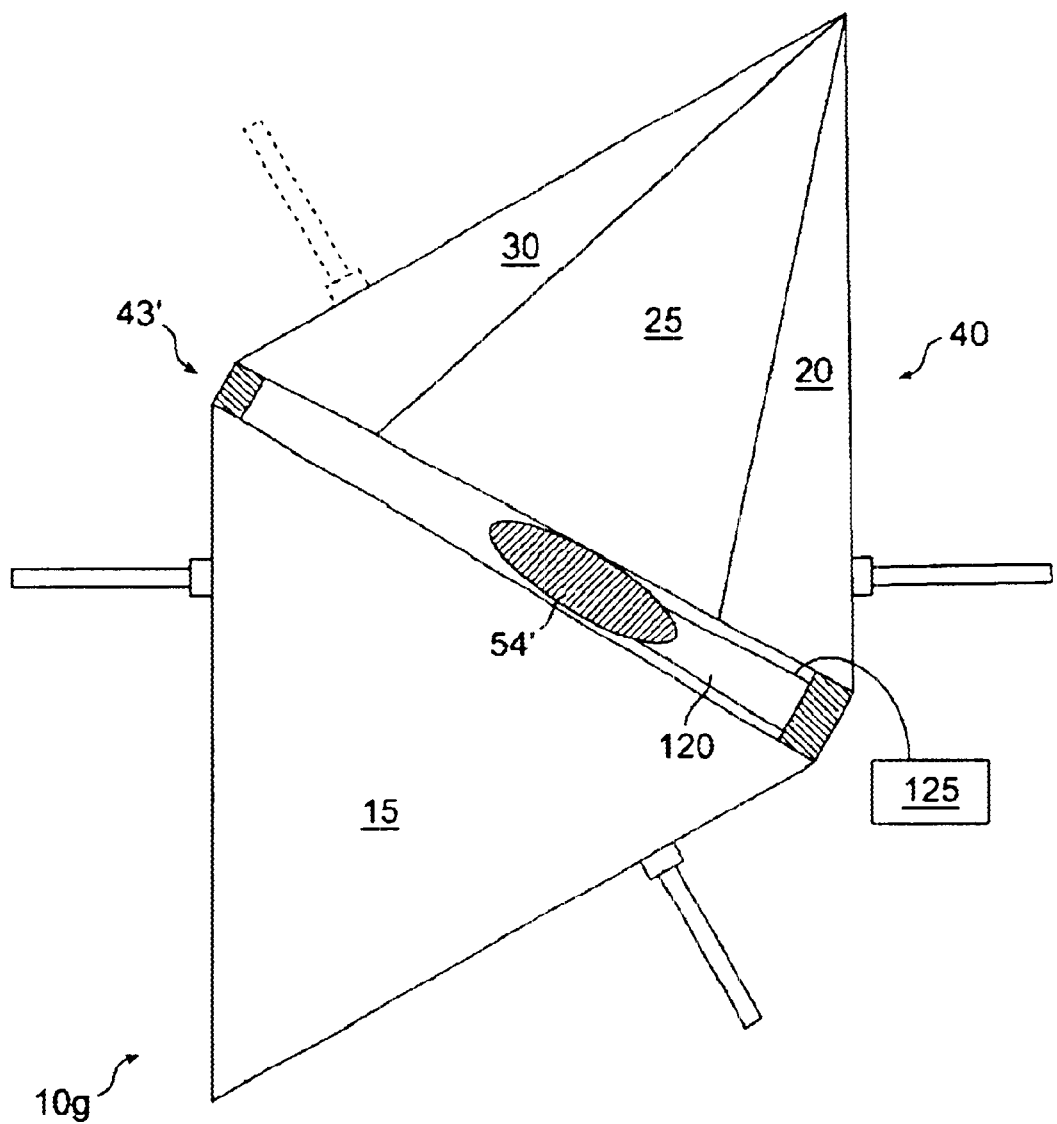

In other embodiments of the WADE 10*g* shown in FIG. 8C the elastic element 54' having a rounded surfaces is disposed in the wedge shaped gap 43'. As shown in FIGS. 8A and 8B the elastic element is coupled to a pushing device 120. As the elastic element is moved into contact with the prisms the rounded surfaces provides for minimal air entrapment between the elastic element and the prisms. More specifically, as the contact area between the elastic element and prism starts at a central point and expands outward therefrom air is pushed from the contact area as a result of the acute angular contact between the element and prisms. As in previously described embodiments the elastic element and/or prisms may be coated with a layer of non-stick material (such as polytetrafluoroethylene) to further ensure air is not trapped upon optical coupling of the elastic element and prisms.

Figure 9:
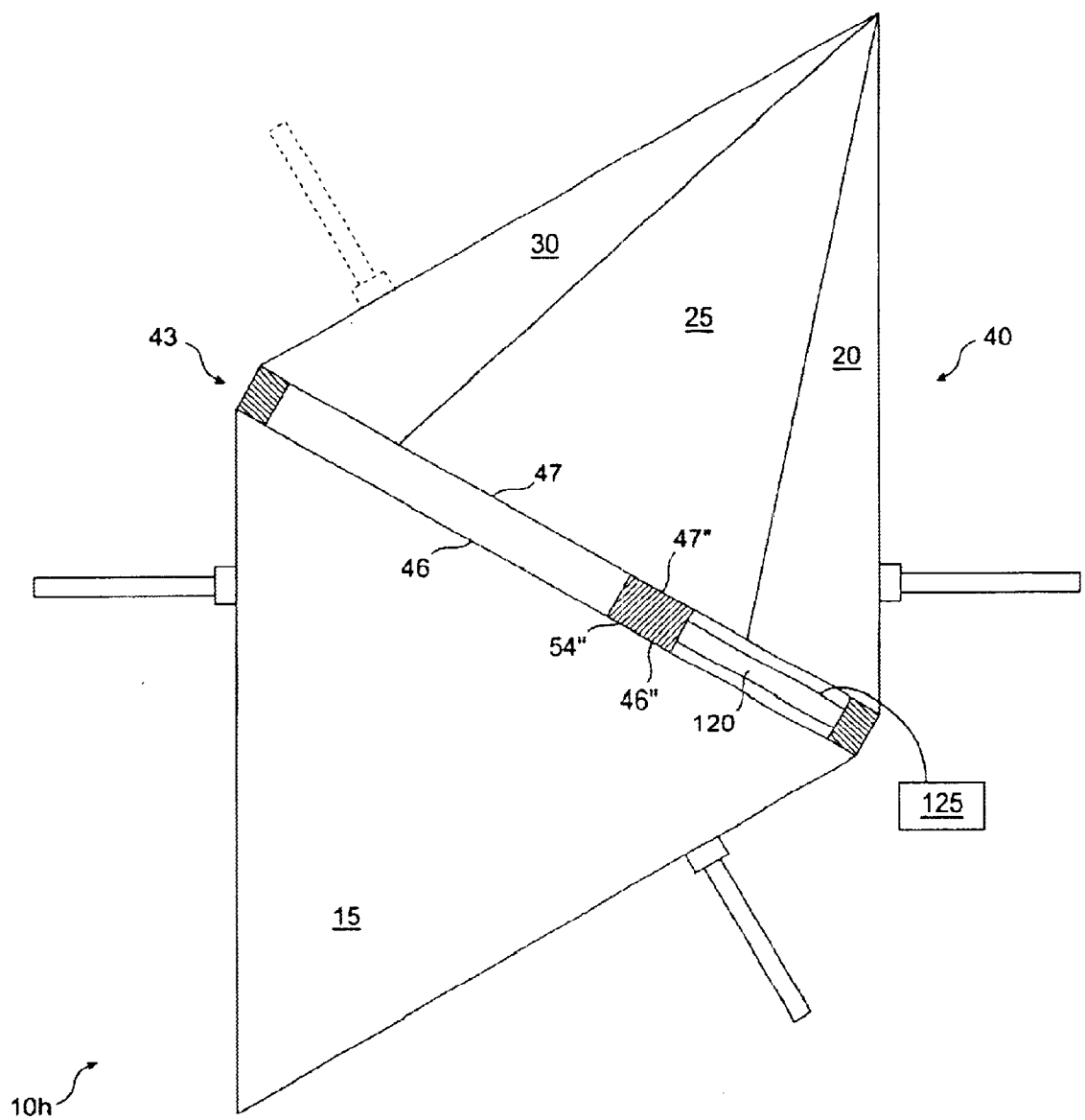
FIG. 9 is a schematic plan view of a basic WADE with pushing mechanism coupled to an elastic element.

FIG. 9 is a schematic plan view of a further alternative embodiment of a WADE 10*h* having an elastic element 54" having surfaces in continuous contact with surfaces 46 and 47 of prism 15 and routing element 40. A pushing device 120 causes the elastic element to slide bidirectionally along the length of a gap 43. The pushing device moves elastic element into or out of contact with prisms 15 and prism 25 at a "central area" at which incoming optical signals are incident. When the elastic element is in contact with the central area the incoming optical signal traverses from prism 15, through the elastic element and into prism 20. The subsequent light path thereafter is as previously described. When the portions of the elastic element in constant contact with surfaces 46 and 47 are pulled from the central area an air gap is disposed in the path of the incoming light. Thus the incoming beam is deflected through total internal reflection in prism 15. While the elastic element shown in FIG. 9 has a relatively flat surfaces other surface shapes are useful in some applications such as round surfaces, or combinations of round and flat surfaces. In a preferred embodiment the prism surfaces adjacent the gap and the elastic element are both coated with a non-stick coating (e.g., a monolayer of polytetrafluoroethylene).

Figure 10B:
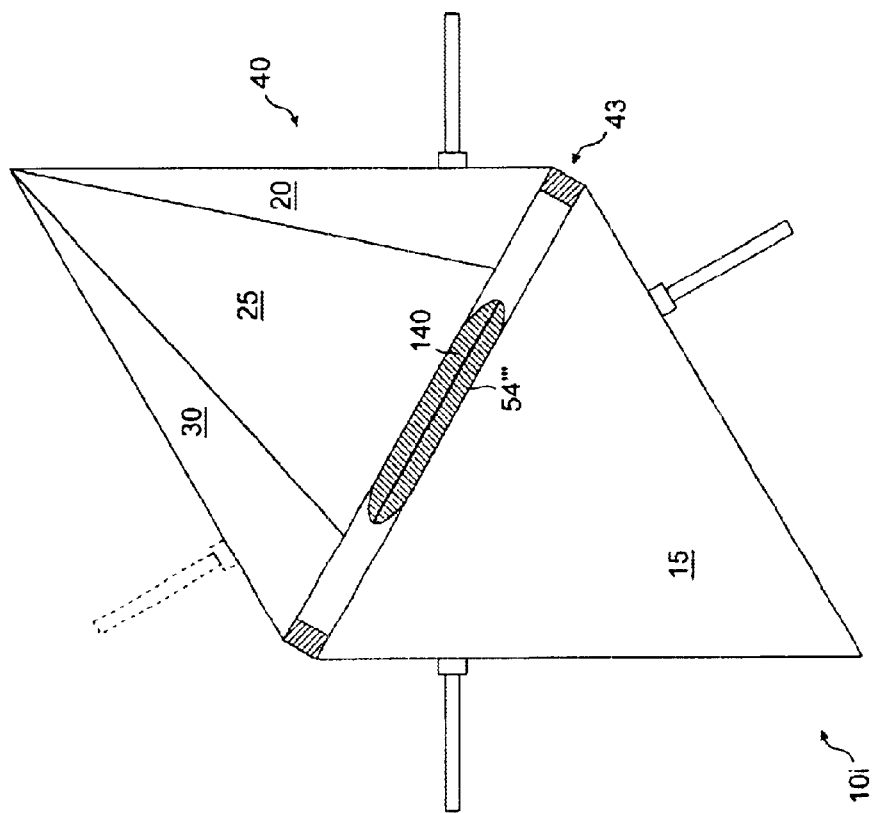
FIGS. 10A, and 10B are schematic plan views of a basic WADE with a contraction mechanism coupled to an elastic element.
Figure 10A:
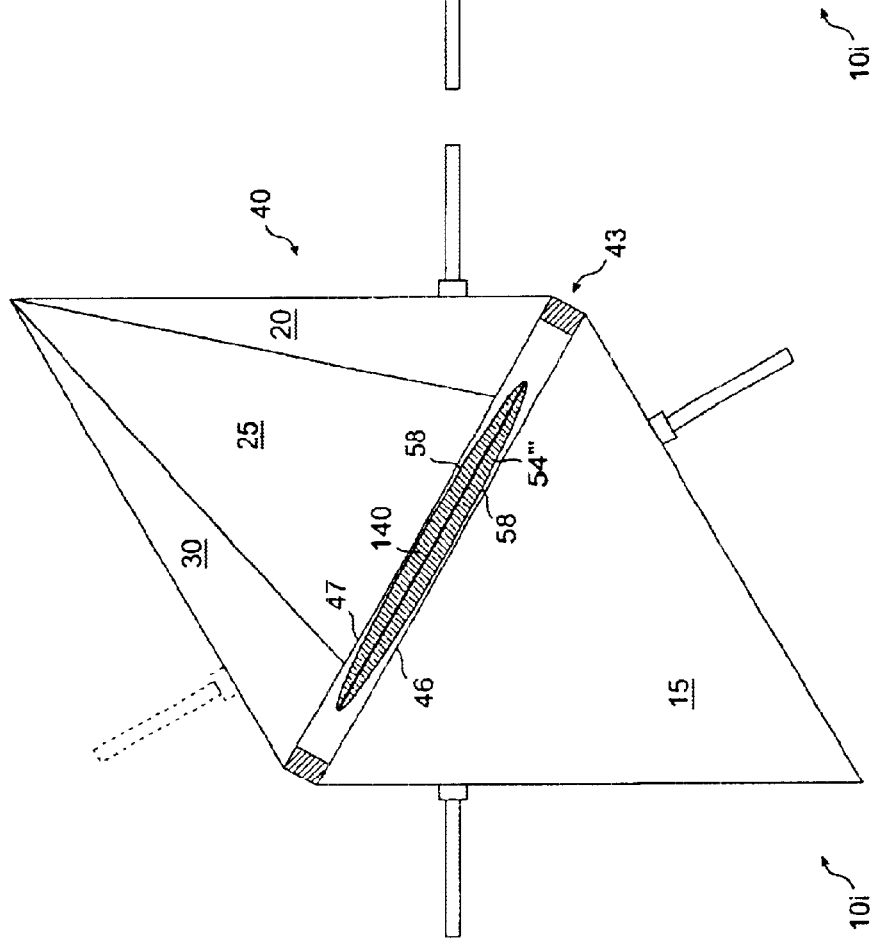

In yet a further embodiment of a WADE 10*i* as shown in FIGS. 10A and 10B an elastic element 54''' having an elongated rounded shape has a belt 140 wrapped about a central section of the element. Coupled to the belt is a mechanism (not pictured) that causes the belt to be drawn in or to expand. The drawing in or expansion of the belt causes a compressive force to be applied or removed from a circumference of the elastic element. FIG. 10B shows the elastic element in a deformed shape as a result of application of compressive forces applied by belt. The deformation of the elastic element causes optical coupling between it and prism 15 and between it and routing element 40. In the absence of a compressive force air gaps 58 are disposed between the elastic element and prism 15 and between the elastic element and routing element 40, FIG. 10A. As previously described in detail, the air gap or absence there of provides for various optical routing of incoming light through the WADE to effect configurable wavelength add drop multiplexing.

The various mechanical actuation mechanisms previously described to effect optical coupling between the various prisms is not limited to use with WADE having triangular shaped prisms but is of use in other embodiments of WADEs herein described such as WADEs having trapezoidal prisms and routing elements and WADEs having planar waveguide structures.

Figure 11:
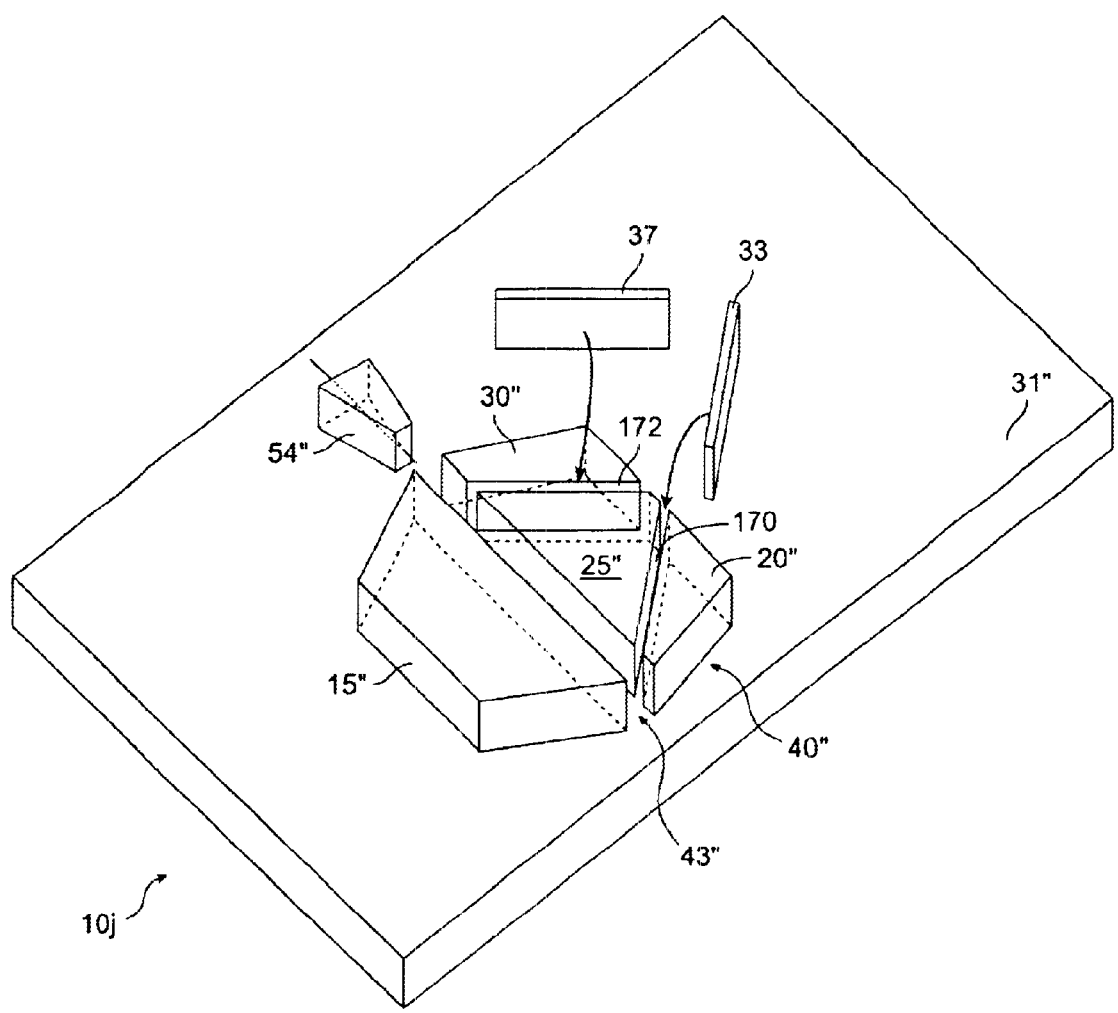
FIG. 11 is a schematic plan view of a basic WADE having a substrate and prisms created as a single structure.

FIG. 11 is a schematic plan view of a WADE 10j that is constructed of a single piece of transparent material. WADE 10j includes prisms 15", 20", 25", and 30" atop a substrate 31". Trenches 170 and 172 are respectfully disposed between prisms 20 and 25 and 25 and 30. Reflectors 33 and 37 are respectively disposed in trenches 170 and 172. Prisms 20, 25 and 30 together with reflectors 33 and 37 form a routing element 40". Disposed between prism 15" and routing element 40" is a gap 43" into which an elastic element 54" is disposed to effect optical coupling between prism 15" and routing element 40". As shown the elastic element is coupled to a putting device 120.

Although, the WADE 10j as shown in FIG. 11 is shown with an elastic element 54" coupled to a pushing device 120 to effect configurable optical coupling between prism 15" and routing element 40" such coupling may be suitably achieved using the various devices and methods herein described.

In a preferred construction the prisms and substrate are formed from a monolithic silica structure, although other materials are of use in some applications such as various thermoplastics (e.g., Plexiglas) or other plastic materials. Various known etching processing may be used to form the prisms and substrate, such as photolithographic-plasma etch techniques, photolithographic-acid etch techniques as well as other known etch techniques. Further formation process may be of use to construct WADE 10j such as the use and techniques of diamond wire cutting, laser ablation, various molding processes and machining techniques. Prisms 20", 25", and 30" together with reflectors 33 and 37 form a routing element 40".

Figure 12:
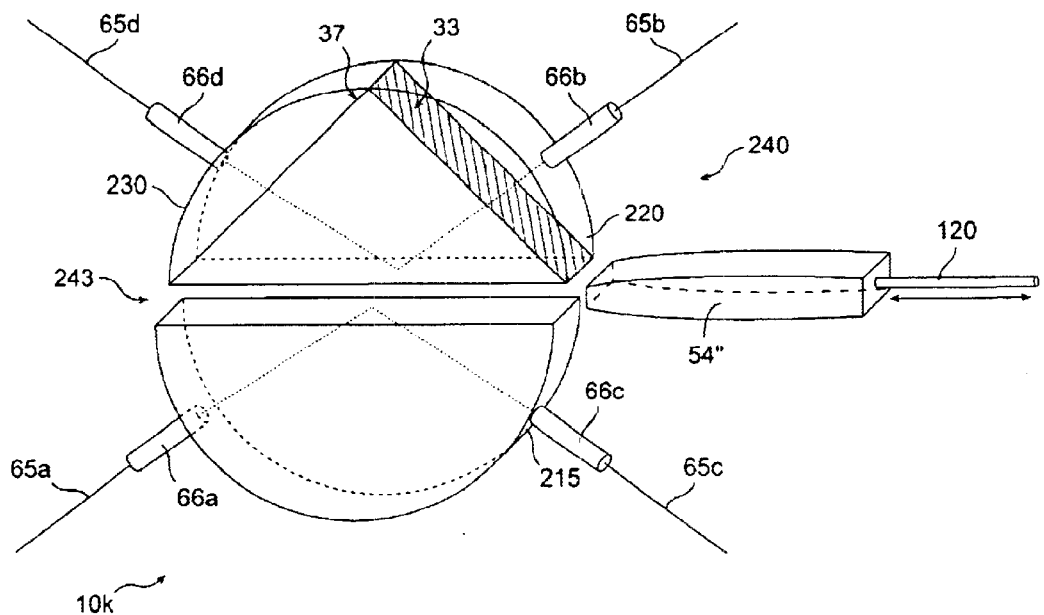
FIG. 12 is a schematic plan view of a basic WADE having a disk shaped profile.

FIG. 12 is a schematic plan view of a WADE 10k having an approximately disk shaped profile. WADE 10k includes prisms 215, 220, 225, and 230 for routing incoming and outgoing optical signals. Disposed respectively between prisms 220 and 225 and between prisms 225 and 230 are reflectors 233 and 237. Prisms 220, 225 and 230 with included reflectors 233 and 237 form a routing element 240 having a semicircle profile. Prism 215 also has a semicircle profile. Disposed between prism 215 and routing element 240 is a gap 243 into which an elastic element 54" is disposed to effect optical coupling between prism 215 and routing element 240. As shown the elastic element is coupled to a putting device 120.

Although, the WADE 10k as shown in FIG. 12 is shown with an elastic element 54" coupled to a pushing device 120 to effect configurable optical coupling between prism 215 and routing element 240 such coupling may be suitably achieved using the various devices and methods herein described.

Waveguide segments 65a, 65b, 65c, and 65d are variously optically coupled to associated prisms as shown in FIG. 12. In a particular embodiment GRIN lenses 66a, 66b, 66c, and 66d are coupled between associated waveguide segment and the prisms. The ends of the GRIN lenses are preferably coupled to the prisms via index of refraction matching glues.

WADE 10k having a disk shaped profile provides for ease of manufacturability. The "disks" are preferably cut from a polished cylinder. The cylinder may either have the reflectors included in the cylinder prior to cutting disks from the cylinder or the reflectors may be disposed between the associated prisms subsequent to the disks being cut from the cylinder. Further the cylinder may be in the form of two polished half cylinders or the disks cut from the cylinder may be subsequently cut into semicircles. Further ease of manufacturability is provided in that fewer polishing steps need be performed on a cylinder than on individual prisms.

Figure 13:
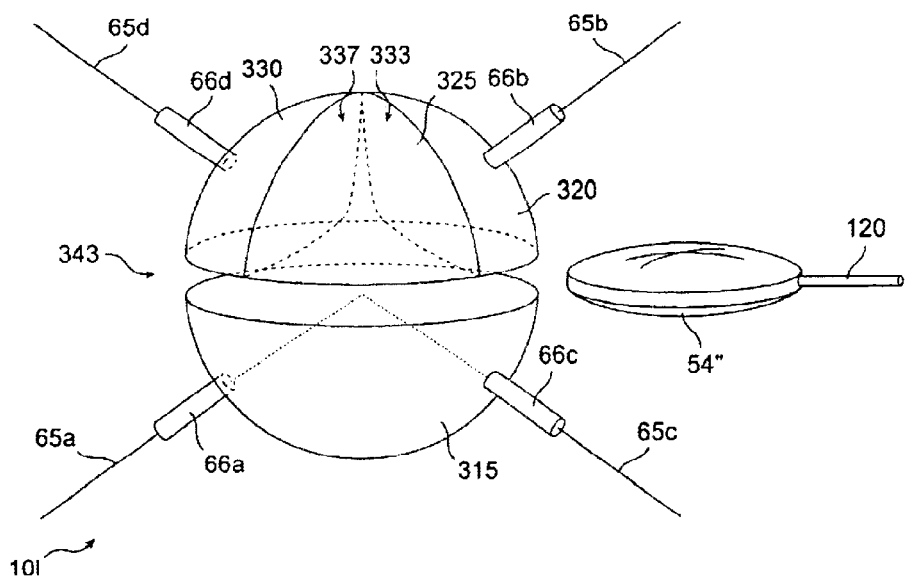
FIG. 13 is a schematic plan view of a basic WADE in the form of a sphere.

FIG. 13 is a schematic plan view of a WADE 10l having an approximately spherical shape. WADE 10l includes prisms 315, 320, 325, and 330 for routing incoming and outgoing optical signals. Disposed respectively between prisms 320 and 325 and between prisms 325 and 330 are reflectors 333 and 337. Prisms 320, 325 and 330 with included reflectors 333 and 337 form a routing element 340 having a semispherical profile. Prism 315 also has a semispherical profile. Disposed between prism 315 and routing element 340 is a gap 343 into which an elastic element 54" is disposed to effect optical coupling between prism 315 and routing element 340. As shown the elastic element is coupled to a putting device 120.

Although, the WADE 10l as shown in FIG. 13 is shown with an elastic element 54" coupled to a pushing device 120 to effect configurable optical coupling between prism 315 and routing element 340 such coupling may be suitably achieved using the various devices and methods herein described.

Waveguide segments 65a, 65b, 65c, and 65d are variously optically coupled to associated prisms as shown in FIG. 13. In a particular embodiment collimating GRIN lenses 66a, 66b, 66c, and 66d are coupled between associated waveguide segment and the prisms. The ends of the GRIN lenses are preferably coupled to the prisms via index of refraction matching glues.

Configurable Wavelength Add Drop Multiplexers

Figure 14A:
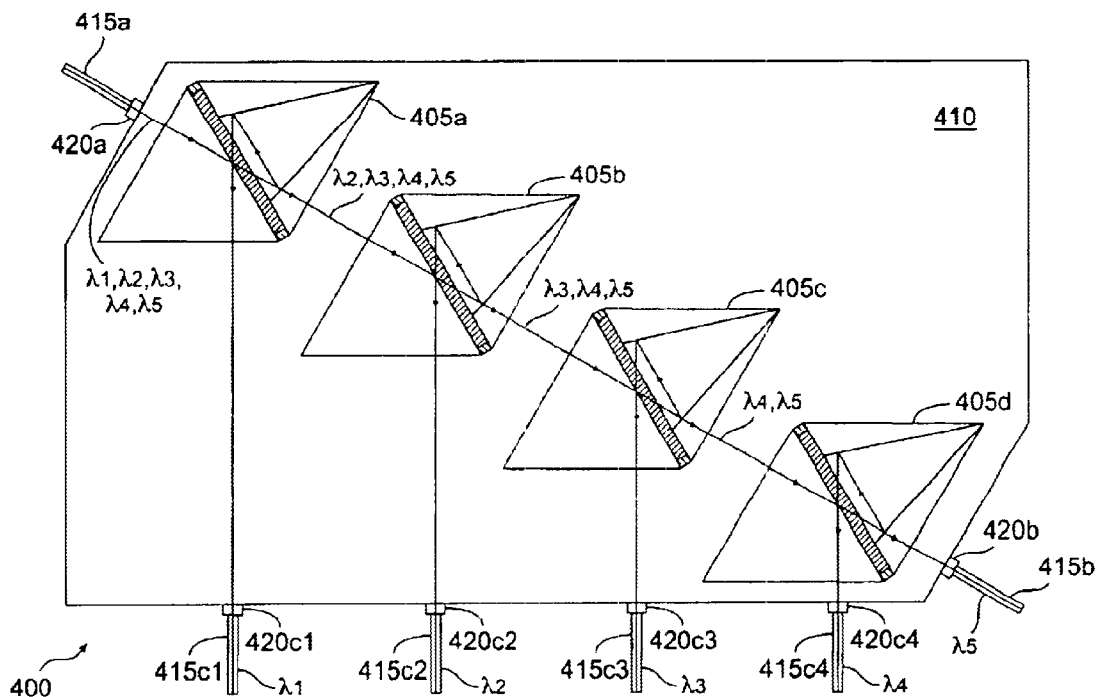
FIGS. 14A and 14B are schematic plans views of configurable wavelength add drop multiplexers showing example operative states.
Figure 14B:
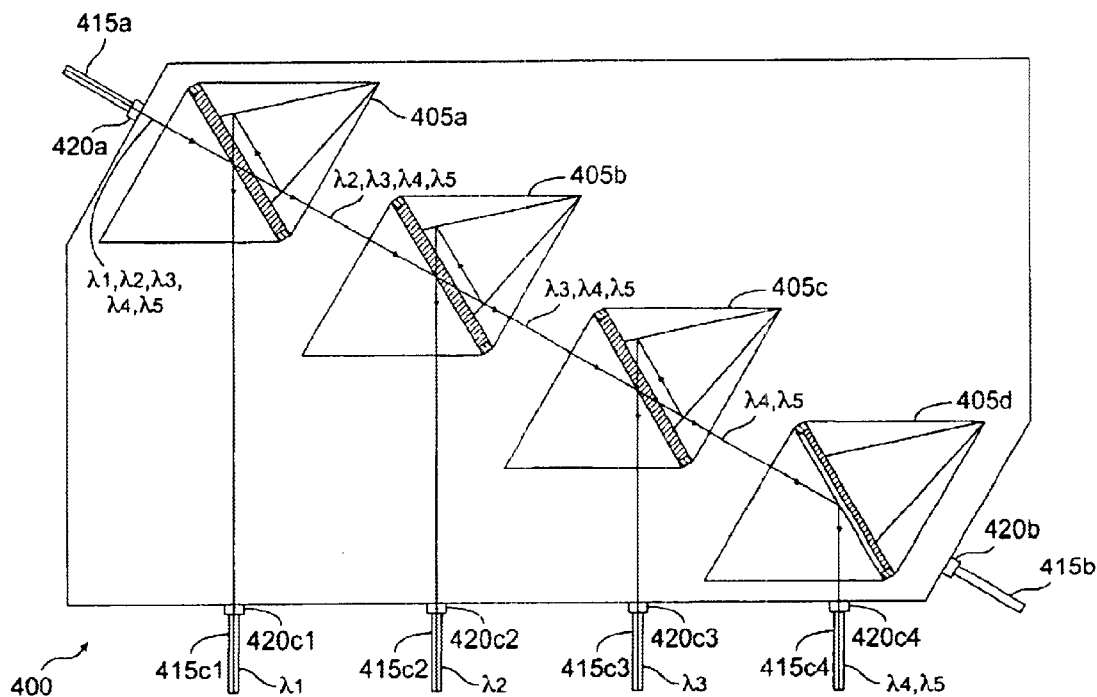

FIGS. 14A and 14B are schematic plan views of operative states of a configurable wavelength add drop multiplexer (CWADM) 400 according to a multiplexing embodiment of the present invention. For example purposes CWADM 400 is shown to comprise four WADEs 405a, 405b, 405c and 405d, but more or fewer WADEs may be of use in some applications. Although the WADEs pictured in FIGS. 14A and 14B are of the WADE shown in FIG. 2, 3A, and 3B, other previously described and pictured WADE embodiments may be used in CWADM 400.

In a specific embodiment the WADEs are disposed in recesses in a planar silica structure 410. The recesses can be formed by numerous methods, such as those currently known in the plasma etch arts, or by the use and methods of diamond wire cutting, or by other appropriate methods. In some embodiment apertures may be made in the planar silica structure for placement of WADEs. The methods listed above for recess formation are also applicable to aperture formation. Aperture formation provides easy access to the sides of the aperture should the sides need to be polished. The WADEs are secured into the recesses and or apertures by the use of refractive index matching glues or by other appropriate means. In other embodiments the WADEs may be mounted atop a substrate structure wherein the WADEs are directly optically coupled by the use of index of refraction matching glues or may be optically coupled by discrete fiber optic segments.

In a further specific embodiment the various prisms of the WADEs forming the CWADM are atop a substrate wherein, the WADEs and substrate are a single piece of transparent material. The prisms of the WADE and underlying substrate may be formed as previously described and as shown in FIG. 11.

Waveguide segments 415a, 415b 415c1, 415c2, 415c3, and 415c4 are coupled to the peripheral edges of the planar silica structure. In some embodiments GRIN lenses 420a, 420b 420c1, 420c2, 420c3, and 420c4 are coupled between their respective waveguide segments and the planar silica structure. Each waveguide segment serves to receive and deliver optical signals to the WADEs for further routing. In a demultiplexing mode of CWADM 400 shown in FIG. 14A, waveguide segments 415a receives an incoming optical signal having a plurality of wavelengths. For example purposes the incoming optical signal (also referred to as a trunk line signal) is shown as including five individual wavelengths $\lambda 1$, $\lambda 2$, $\lambda 3$, $\lambda 4$, and $\lambda 5$, but the incoming optical signal may include more or fewer individual wavelengths. At each WADE one of the wavelengths is routed into one of the waveguide segments, 415b, 415c1, 415c2, 415c3, or 415c4 and is diverted from the trunk line signal. As shown by way of example in FIG. 14A, $\lambda 1$, $\lambda 2$, $\lambda 3$, $\lambda 4$, and $\lambda 5$ are respectively diverted in waveguide segments 415c1, 415c2, 415c3, 415c4 and 415b.

Alternate from a demultiplexing mode, CWADM 400 can also operative in a multiplexing mode. CWADM 400 operating in a multiplexing mode receives $\lambda 1$, $\lambda 2$, $\lambda 3$, $\lambda 4$, and $\lambda 5$ respectively via waveguide segments 415c1, 415c2, 415c3, 415c4 and 415b and combines/multiplexes the wavelengths onto waveguide segment 415a. Typically the satisfaction of both multiplexing and demultiplexing needs are satisfied by two CWADMs. One CWADM serves to drop signal from a trunk line while the other serves to add signal to a trunk line.

FIG. 14B shows an alternate operative state of a CWADM 400. As each individual WADE used to comprise CWADM 400 is configurable, so too is CWADM 400. Independent configurability of each WADE in the CWADM provides for the option of either dropping or not dropping a wavelength or group of wavelength at a given optical node. As shown in FIG. 14B the TEE of WADE 405d is in its contracted state (it being assumed any of the WADE may be so configured) thus $\lambda 5$ is not dropped at waveguide segment 415b but is instead diverted into waveguide segment 415c4 along with $\lambda 4$. Such a features provides that multiple signals (e.g., $\lambda 4$ and $\lambda 5$) can be configurably dropped at a node while subsequent nodes do not receive signals. Such a feature provides for a plurality of nodes to be bypassed via the configuration of a single WADE.

Figure 15A:
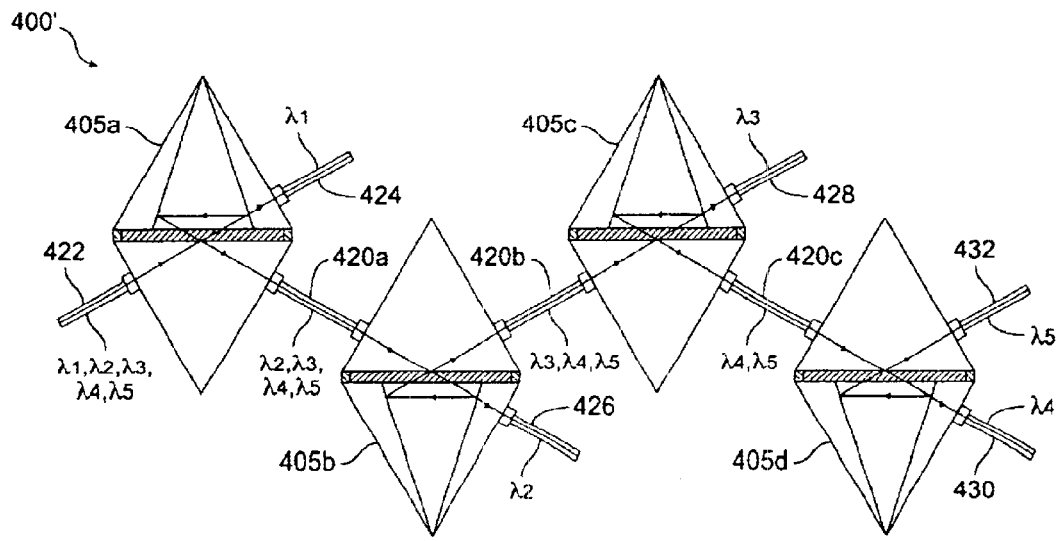
FIGS. 15A and 15B are schematic plan views of a configurable wavelength add drop multiplexers showing example operative states.
Figure 15B:
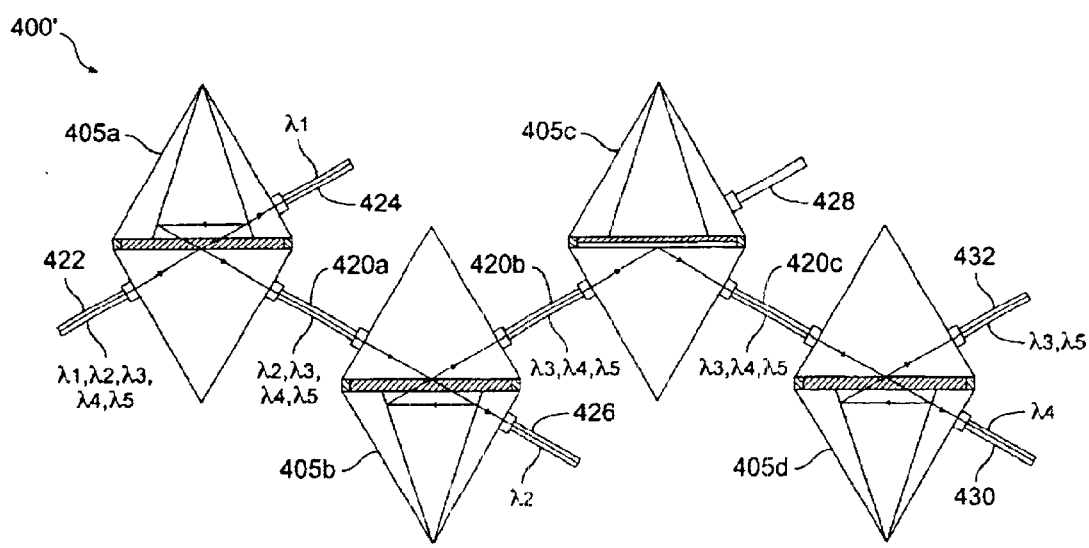

FIGS. 15A and 15B are schematic plan views of an alternative embodiment of a CWADM 400' and show example operative states the CWADM. For example purposes CAWDM 400' is comprised of a four WADEs 405a, 405b, 405c and 405d, but more or fewer WADEs may be of use in some applications. The previous numbering scheme is adopted for previously described equivalent elements. Although the individual WADEs pictured in FIGS. 15A and 15B are of that shown in FIGS. 2, 3A, and 3B, other previously described and pictured WADE embodiments may be used in CWADM 400'. The WADEs are optically coupled via waveguide segments 420a, 420b and 420c. Waveguide segments 422 and 424 are coupled to WADE 405a. Waveguide segment 426 is coupled to WADE 405b. Waveguide segment 428 is coupled to WADE 405c and waveguide segments 430 and 432 are coupled to WADE 405d. Each waveguide segment 422, 424, 426, 428, 430, and 432 serves both to deliver and receive optical signals. In an alternative embodiment (as in previously described embodiments) the WADEs may be optically coupled by their placement in recesses formed in a planar silica structure. Wherein optical fibers are coupled to the periphery of the silica and serve both to deliver and receive optical signals.

In the demultiplexing mode of CWADM 400' shown in FIG. 15A, waveguide segment 422 receives an incoming optical signal having a plurality of wavelengths. For example purposes the incoming optical signal (also referred to as a trunk line signal) is shown as including five individual wavelengths $\lambda 1$, $\lambda 2$, $\lambda 3$, $\lambda 4$, and $\lambda 5$, but the incoming optical signal may include more or fewer individual wavelengths. At each WADE one of the wavelengths is routed into one of the waveguide segments, 424, 426, 428, 430, and 432 and is diverted from the trunk line signal. As shown by way of example in FIG. 15A, $\lambda 1$, $\lambda 2$, $\lambda 3$, $\lambda 4$, and $\lambda 5$ are respectively diverted in waveguide segments 422, 424, 426, 428, 430, and 432. In the multiplexing mode wavelengths $\lambda 1$, $\lambda 2$, $\lambda 3$, $\lambda 4$, and $\lambda 5$, are received respectively by waveguide segments 424, 426, 428, 430, and 432 and are combined/multiplexed by the various WADEs onto waveguide segment 422.

FIG. 15B shows an alternate operative state of a CWADM 400'. As each individual WADE used to comprise CWADM 400' is configurable, so too is CWADM 400'. Each WADE, independent configurability, provides for the option of either dropping or not dropping a wavelength or group of wavelength at a given optical node. As shown in FIG. 15B the TEE of WADE 405c is in its contracted state (it being assumed any of the WADE may be so configured) thus $\lambda 3$ is not dropped at waveguide segment 428 but is instead diverted into waveguide segment 432 along with $\lambda 5$. Such a features provides that a single wavelength (e.g., $\lambda 3$) need not be dropped at a node but can be keep on the trunk line or dropped at a different node. CWADM 400' provides similar yet varied functional benefits as compared to previously described embodiments. Configuring a WADE in the present embodiment not to drop a selected wavelength at a selected node does not affect downstream traffic. For example, as shown in FIG. 15B, CWADM 400' is configured not to drop $\lambda 3$ at waveguide segment 428, yet $\lambda 4$ and $\lambda 5$ are still delivered to their respective nodes via waveguides 430 and 432. As compared to previously described embodiments that allow for a plurality of nodes in downstream traffic to be cut off by a single suitably configured WADE, the presently described embodiments allows for nodes to be selectively bypassed on an individual bases. Similarly described, individual wavelengths can be diverted from a node while not affecting downstream traffic. Both embodiment CWADM 400 and CWADM 400' provide features for low cost fast coupling of an optical network to a node, such as an end user site or further optical networking. Thus potential end user sites or further optical networks can lay dormant until ready to hook up to an optical network; moreover the dormant nodes need not be coupled to costly signal regeneration hardware placed at the nodes as is necessary with known non-configurable add drop multiplexers.

Air Gap Width and Evanescent Wave Decay Considerations

In the above discussion of the various switch matrix embodiments, it was assumed that total internal reflection occurred at the air gap. As a practical matter, this will be true so long as the air gap is long enough. Following is a more detailed discussion of the mechanism of total internal reflection.

It is well known to those skilled in the art that light traveling in a medium having a given index of refraction will in general be partially reflected and partially transmitted when it encounters an interface with a medium having a different index of refraction. The relative amounts of reflected and transmitted light depend on the refractive indices of the media and the angle of incidence, which is normally measured from the normal (or perpendicular) to the interface.

It is also well known that light traveling in a medium having a given index of refraction will be totally internally reflected at an interface with a medium having a lower index of refraction if the light is incident at an angle that is larger than what is referred to as the critical angle. The critical angle depends on the indices of refraction in the two media.

It is also well known that total internal reflection is an idealization in the sense that the light traveling in the high-index medium actually penetrates beyond the interface with the low-index medium. This is referred to as the evanescent wave. If the low-index medium is a layer sandwiched between regions of high-index material, and if this layer is sufficiently thin, some of the light will actually pass through the layer of low-index material and enter the remote region of high-index material.

Figure 16:
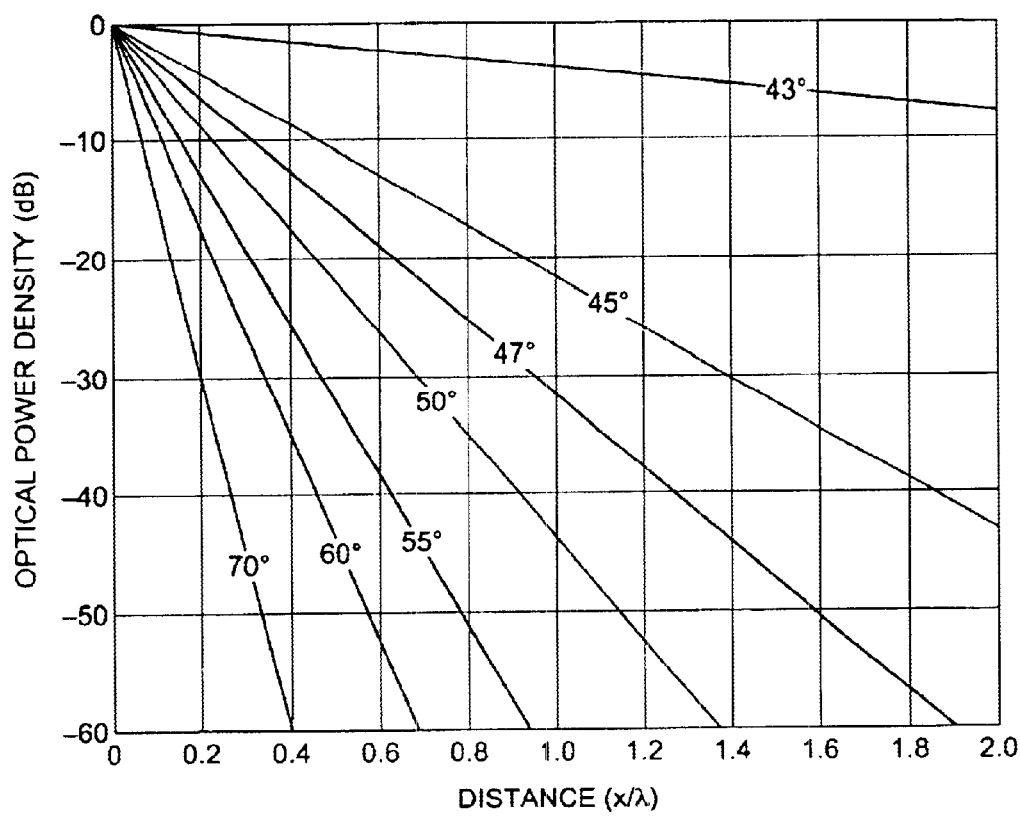
FIG. 16 is a graph showing the dependence of evanescent wave decay on incident angle.

FIG. 16 is a graph showing the dependence of evanescent wave decay on incident angle for the specific case of interest here, namely an embodiment where the high-index medium is silica with a refractive index of 1.468 and the low-index medium is air or vacuum with a refractive index of 1. The graph shows the light power density (in dB) as a function of distance (normalized in units of the wavelength) for various angles of incidence. The figures illustrating the embodiments described above show an angle of incidence of 60°. As can be seen in FIG. 12, the optical power density is only attenuated to −50 dB (as is generally desired) at a distance of 0.6 wavelengths from the interface. Hence, appropriate air gap widths can be appropriately set by consideration of evanescent wave decay in the air gap.

Thermal Expansion Element (TEE) and Elastic Element Material Considerations

Relevant physical properties for the TEE material include light transmission, refractive index, coefficient of thermal expansion, and glass transition temperature. Also to be considered are the changes of these properties with time or through repeated small cyclic deformations due to the thermal expansion and contraction that occur during operation of the routing element.

The material for the TEE is preferably a polymeric material, which is made up of large chain-like molecules. Polymers can be rubbery or glassy—the former are typically referred to as elastomers, the latter plastics. The properties are determined by the chemical composition of the links in the chain (monomers), the molecular architecture (i.e., the length of the chain, and the branching and network structure), and the solid state morphology (i.e., the way that the chains are arranged or packed together). These factors can be tailored to provide a high degree of flexibility in the design. That is, polymers can be designed to exhibit a wide range of properties by suitably varying these factors. Composition-property relationships are known for estimating the values for certain properties.

Regarding molecular architecture and solid state morphology, the material should be an elastic, transparent, isotropic solid that is easily and reversibly deformable. This is essentially the definition of a crosslinked elastomeric material (an elastomer being a very high molecular weight polymer with a glass transition temperature well below ambient temperature).

The refractive index depends very strongly on composition, and can be varied over a wide range from 1.35 to 1.6 or more. The glass transition temperature is also strongly dependent on composition. The linear coefficient of thermal expansion can be varied for elastomers over a range of $1.5-3.0 \times 10^{-4}°$ C. Generally, elastomers have higher thermal expansion coefficients than plastics (say on the order of a factor of 2), which is another reason that an elastomeric material is preferred. Absorbance should be low for most organic polymers, and can be minimized by choosing structures that do not have strong absorbance features in the near infrared.

While the refractive index of the TEE is less important when the TEE is in the contracted state (therefore defining the total internal reflection mode), it can be a concern when the TEE is in the expanded state. In this state, Fresnel reflections arising from an index mismatch could give rise to crosstalk since a small fraction of the light, all of which is nominally to be transmitted, could be reflected. Achieving a desired refractive index for a polymer can be achieved by copolymerization. As is well known, the composition of a polymer can be varied by combining two or more different monomer units to form the polymer chain (i.e., copolymerization). For example, it is possible to make a silicone elastomer (polysiloxane) by combining dimethyl siloxane units (refractive index of 1.41) with methylphenysiloxane units (refractive index of 1.53) in the proper ration to obtain a copolymer with refractive index of 1.47 to match the refractive index of silica (the waveguide material). These components are commercially available and techniques for combining them are well known. A similar approach can be use to design acrylic or other families of polymers to achieve the desired refractive index.

Relevant physical properties for the elastic element are similar to those of the TEE and include light transmission, refractive index, and glass transition temperature. The material for the elastic element like the TEE is preferably a polymeric material, which is made up of large chain-like molecules. The elastic element should be transparent, moreover it should be an isotropic elastomeric solid that is easily and reversibly deformable for which the glass transition temperature is well below ambient temperature.

Properties of elastomeric materials change with time primarily as a result of chemical changes induced by photolysis, oxidation, or hydrolysis. Since the material will generally not be exposed to ultraviolet radiation, oxygen, or moisture, this should not be a problem. Physical aging under mechanical stress, while possible since cyclical deformation could lead to fatigue (cracking) or compression set, is unlikely in view of the small deformations involved.

Conclusion

While the above is a complete description of specific embodiments of the invention, various modifications, alternative constructions, and equivalent may be used while preserving the fundamental invention of the embodiments. Thus, the above description should not be taken as limiting the scope of the invention as defined by the claims.

What is claimed is:

1. A configurable wavelength multiplexing device for use with incoming light at first and second wavelengths, the device comprising:

first, second, and third reflectors;

the first reflector, referred to as the configurable reflector, being disposed to intercept the incoming light traveling along an input path, the first reflector having a first state in which it transmits the incoming light along a first transmitted path and a second state in which it reflects the incoming light along a first reflected path;

the second reflector being a wavelength-selective reflector that reflects light of the first wavelength and transmits light of the second wavelength;

the third reflector reflecting at least light of the first wavelength;

the first, second, and third reflectors being oriented so that when the incoming light is transmitted along the first transmitted path, the light of the first wavelength is reflected by the second and third reflectors to travel along second and third reflected paths, the third reflected path intersecting the first reflector at an angle such that the light of the first wavelength is transmitted by the first reflector and continues on the first reflected path; and the light of the second wavelength is transmitted by the second reflector along a second transmission path that is distinct from the first transmission path.

2. The device of claim 1, wherein the first, second, and third reflectors are further oriented so that the first transmitted and reflected paths are more than 45 degrees from the normal to the first reflector, and the second transmitted path is less than 22.5 degrees from the normal to the second reflector.

3. The device of claim 2, wherein:

the first reflector is located in a routing region bounded on first and second sides by a first transparent material having a refractive index greater than 1; and the first reflector includes a body of a second transparent material having a refractive index greater than 1 disposed in the routing region, the body having a contracted state at a first temperature and an expanded state at a second temperature, wherein the contracted state defines an air gap disposed in the path of the incoming light traveling along the input path so as to cause the incoming light to be deflected onto the first reflected path through total internal reflection, and the expanded state removes the air gap disposed in the path of the incoming light traveling along the input path so as to allow the incoming light to pass through the body of transparent material and travel along the first transmitted path.

4. The device of claim 3, wherein:

the first transparent material is silica; and the second transparent material is an elastomeric material.

5. The device of claim 2, wherein the incoming path, the first and second transmitted paths, and the first, second, and third reflected paths are in non-waveguiding material.

6. The device of claim 2, wherein:

the first transmitted and reflected paths are approximately 60 degrees from the normal to the first reflector, and the second transmitted path is approximately 15 degrees from the normal to the second reflector.

7. The device of claim 2, wherein:

the light of the first wavelength, once passing through the first reflector, encounters the second reflector before the third reflector; and the light of the second wavelength, once passing through the first reflector, encounters the second reflector but not the third reflector.

8. The device of claim 2, wherein:

the light of the first wavelength, once passing through the first reflector, encounters the second reflector after the third reflector; and the light of the second wavelength, once passing through the first reflector, encounters the third and second reflector in that order.

9. A configurable wavelength multiplexing device for use with incoming light at first and second wavelengths, the device comprising:

first, second, third, and fourth prisms;

first, second, and third, reflectors;

the second reflector is a wavelength-selective reflector coupled between the second and third prisms; wherein the third reflector is a wavelength-selective reflector coupled between the third and fourth prisms;

the second, third, and fourth prisms and the second and third reflectors form a routing element; and a gap is disposed between the first prism and the routing element, the gap having a front bounded by the first prism and a back bounded by the routing element; and a body of transparent material is disposed in the gap between the first prism and the routing element, said body having a contracted state at a first temperature and an expanded state at a second temperature, wherein the contracted state defines an air gap disposed in the path of light traveling along an input path, so as to cause the incoming light to be deflected by the first reflector onto a first reflected path through total internal reflection, and the expanded state removes the air gap in the path of the incoming light traveling along the first input path so as to allow the incoming light to pass from the first prism into the body of transparent material and into the routing element.

10. The device of claim 9, wherein:

the second reflector reflects light of the first wavelength and transmits light of the second wavelength;

the third reflector reflects at least light of the first wavelength;

the first, second, and third reflectors are oriented so that when the incoming light is transmitted along the first transmitted path, the light of the first wavelength is reflected by the second and third reflectors to travel along second and third reflected paths, the third reflected path intersecting the first reflector at an angle such that the light of the first wavelength is transmitted by the first reflector and continues on the first reflected path, and the light of the second wavelength is transmitted by the second reflector along a second transmission path that is distinct from the first transmission path; and the first, second, and third reflectors are further oriented so that the first transmitted and reflected paths are more than 45 degrees from the normal to the first reflector, and the second transmitted path is less than 22.5 degrees from the normal to the second reflector.

11. The device of claim 9, and further comprising a substrate structure, wherein the first, second, third, and fourth prisms are atop the substrate structure, and the substrate structure, the first, second, third, and fourth prisms are a single body of material.

12. The device of claim 11, wherein the substrate structure, the first, second, third, and fourth prisms are etched from a monolithic transparent body.

13. The device of claim 11, wherein the substrate structure, the first, second, third, and fourth prisms are constructed in a molding process.

14. The device of claim 9, wherein the first prism and routing element have respective first and second rigid faces adjacent the gap, the body of transparent material is attached to the second rigid face, and the body of said transparent material optically couples to the first rigid face in said expanded configuration but not in said second configuration.

15. The device of claim 14, wherein the first rigid face is coated with a non-stick coating.

16. The device of claim 15, wherein the non-stick coating includes a layer of polytetrafluoroethylene.

17. The device of claim 9, and further comprising:
a first waveguide segment coupled to the first prism for delivering the incoming light to the first prism;
a second waveguide segment coupled to the first prism for receiving the first wavelength; and
a third waveguide segment coupled to the second prism for receiving at least the second wavelength.

18. The device of claim 17, and further comprising:
a fourth waveguide segment coupled to the fourth prism for delivering additional incoming light to the fourth prism, wherein the additional incoming light has a third wavelength, and the second waveguide segment receives the additional incoming light.

19. The device of claim 9, wherein the first prism and the routing element each have a semicircular shape.

20. The device of claim 9, wherein the first prism and the routing element each have a hemispherical shape.

21. The device of claim 9, wherein the first prism, the third prism and the routing element each have an isosceles triangular shape, the second and fourth prisms each have an obtuse triangular shape.

22. The device of claim 21, wherein the first prism and the routing element each have an equilateral triangular shape.

23. The device of claim 22, wherein the first prism has first and second interior angles adjacent the gap that are equal, the third prism has first and second interior angles adjacent the gap that are equal, the first and second interior angles of the first prism are each 2 times the sum of the first or second interior angles of the third prism plus 45 degrees.

24. The device of claim 21, wherein the first and second interior angles of the first prism are each greater than or equal to 60 degrees.

25. The device of claim 9, wherein the first prism and the routing element each have trapezoidal shapes.

26. The device of claim 10, and further comprising a fourth reflector disposed in the path of light reflected from the second reflector and diverting the light to the third reflector.

27. The device of claim 26, wherein the fourth reflector is a thin film disposed on the surface of the third prism, the fourth reflector being of such length so as not to block optical signals transmitted through the body of transparent material.

28. The device of claim 26, wherein the fourth reflector is disposed in a recess formed in the third prism, the fourth reflector being of such length so as not to block optical signals transmitted through the body of transparent material.

29. The device of claim 9, and further comprising:
a pair of spacer elements coupled between the first prism and the routing element, the spacer elements determining the width of the gap disposed therebetween.

30. The device of claim 29, wherein the gap is in a range of about 100–200 micrometers wide.

31. A configurable wavelength multiplexing device for use with incoming light at first and second wavelengths, the device comprising:
first, second, and third planar waveguide structures;
first, second, and third reflectors;
a gap having a front and back being disposed in the first planar waveguide structure;
first, second, third, fourth and fifth waveguide segments disposed in the first planar waveguide structure, wherein
the first and second waveguide segments extend from the front of the gap and are each at least 60 degrees from a normal to the front of the gap and are separated by at least 120 degrees from each other,
the third and fourth waveguide segments extend from the back of the gap and are each at least 60 degrees from a normal to the back of the gap and are separated by at least 120 degrees from each other, and
the fifth waveguide segment is coupled between the second and third reflectors;
sixth and seventh waveguide segments respectively disposed in the second and third planar waveguide structures; wherein
the second reflector being is a wavelength-selective reflector coupled between the second and sixth waveguide segments;
the third reflector is a wavelength-selective reflector coupled between the fourth and seventh waveguide segments; and
a body of transparent material and disposed in the gap, said body having a first state and a second state, wherein
the first state defines an air gap disposed in the path of the incoming light traveling along the first waveguide segment, causing the incoming light to be deflected into the second waveguide segment through total internal reflection, and
the second state removes the air gap in the path of the incoming light traveling along the first waveguide segment allowing the incoming light to pass from the first waveguide segment into the body of transparent material and into the third waveguide segment.

32. The device of claim 31, wherein:
the second reflector reflects light of the first wavelength and transmits light of the second wavelength;
the third reflector reflects at least light of the first wavelength;
the first, second, and third reflectors are oriented so that when the incoming light is transmitted along the third waveguide segment;
the light of the first wavelength is reflected by the second and third reflectors to travel first along the fifth waveguide segment and to subsequently travel along the fourth waveguide segment;
the fourth waveguide segment intersects the first reflector at an angle such that the light of the first wavelength is transmitted by the first reflector and continues into the second waveguide segment; and
the light of the second wavelength is transmitted by the second reflector into the sixth waveguide segment.

33. The device of claim 31, wherein:
the first state is a thermally expanded state;
the body of transparent material is attached to the back of the gap; and
the body of transparent material optically couples to the front of the gap in said first state but not in said second state.

34. The device of claim 31, and further comprising:
a first optical fiber coupled to the first waveguide segment for delivering the incoming light to the segment;
a second optical fiber coupled to the second waveguide segment for receiving the first wavelength from the segment; and
a third optical fiber coupled to the sixth waveguide segment for receiving at least the second wavelength from the segment; wherein:

the first, second, and sixth waveguide segments have a given width at the respective positions at the edges of the respective planar waveguide structures;

the first, second, and third optical fibers each have having a core that flares to a maximum diameter where it contacts the respective waveguide segment, the maximum diameter being matched to the given width.

35. The device of claim 34, and further comprising:

a fourth optical fiber coupled to the seventh waveguide segment for delivering additional incoming light to the segment, the additional incoming light has a third wavelength, wherein the seventh waveguide segment receives the additional incoming light; wherein:

the seventh waveguide segment has a given width at the edge of the third planar waveguide structure; and the fourth optical fiber has a core that flares to a maximum diameter where it contacts the seventh waveguide segment, the maximum diameter being matched to the given width.

36. The device of claim 3, wherein the incoming path, the first and second transmitted paths, and the first, second, and third reflected paths are defined by waveguide segments in a planar waveguide structure.

37. A configurable wavelength multiplexing device for use with incoming light at first and second wavelengths, the device comprising:

first, second, third, and fourth prisms, said first prism being spaced from said third prism to define a gap having a front bounded by the first prism and a back bounded by the third prism;

a first wavelength-selective reflector coupled between the second and third prisms a second reflector coupled between the third and fourth prisms; and a body of transparent material disposed in the gap between the first prism and the routing element, the body having a first state that defines an air gap disposed in the path of light traveling along an input path so as to cause the incoming light to undergo total internal reflection onto a first reflected path, and a second state that removes the air gap in the path of the incoming light traveling along the first input path so as to allow the incoming light to pass from the first prism into the body of transparent material and into the third prism so as to encounter the first wavelength-selective reflector.

38. The device of claim 37, wherein:

the first wavelength-selective reflector reflects light of the first wavelength and transmits light of the second wavelength;

the second reflector reflects at least light of the first wavelength;

the first wavelength-selective reflector and the second reflector are oriented so that when the incoming light is transmitted along the first transmitted path, the light of the first wavelength is reflected by the first wavelength-selective reflector and the second reflector to travel along second and third reflected paths, the third reflected path intersecting the transparent body at an angle such that the light of the first wavelength is transmitted by the transparent body into the first prism and continues on the first reflected path, and the light of the second wavelength is transmitted by the first wavelength-selective reflector along a second transmission path that is distinct from the first transmission path.

39. The device of claim 38, wherein the first wavelength-selective reflector and the second reflector are further oriented so that:

the first transmitted and reflected paths are more than 45 degrees from the normal to the air gap; and the second transmitted path is less than 22.5 degrees from the normal to the first wavelength-selective reflector.

40. The device of claim 37, wherein the the second reflector is a wavelength-selective reflector that transmits light of a third wavelength.

41. The device of claim 37, wherein:

at a first temperature the body is in the first state; and at a second temperature the body is in the second state.

42. The device of claim 37, and further comprising a substrate structure, wherein the first, second, third, and fourth prisms are atop the substrate structure, and the substrate structure, the first, second, third, and fourth prisms are a single body of material.

43. The device of claim 42, wherein the substrate structure, the first, second, third, and fourth prisms are etched from a monolithic transparent body.

44. The device of claim 42, wherein the substrate structure, the first, second, third, and fourth prisms are constructed in a molding process.

45. The device of claim 37, wherein the first prism and third prism have respective first and second rigid faces adjacent the gap, the body of transparent material is attached to the second rigid face, and the body of said transparent material optically couples to the first rigid face in said second state but not in said first state.

46. The device of claim 45, wherein the first rigid face is coated with a non-stick coating.

47. The device of claim 46, wherein the non-stick coating includes a layer of polytetrafluoroethylene.

48. The device of claim 37, and further comprising:

a first waveguide segment coupled to the first prism for delivering the incoming light to the first prism;

a second waveguide segment coupled to the first prism for receiving the first wavelength; and a third waveguide segment coupled to the second prism for receiving at least the second wavelength.

49. The device of claim 48, and further comprising:

a fourth waveguide segment coupled to the fourth prism for delivering additional incoming light to the fourth prism, wherein the additional incoming light has a third wavelength, and the second waveguide segment receives the additional incoming light.

50. The device of claim 37, wherein the first prism has a hemispherical shape, and the second, third, and fourth prisms form a hemispherical shape.

51. The device of claim 37, Wherein the first, second, third, and fourth prisms each have a triangular shape.

52. The device of claim 37, wherein the first prism has an equilateral triangular shape, and the second, third, and fourth prisms form an equilateral triangular shape.

53. The device of claim 37, wherein the first prism has first and second interior angles adjacent the gap that are equal, the third prism has first and second interior angles adjacent the gap that are equal, the first and second interior angles of the first prism are each 2 times the sum of the first or second interior angles of the third prism plus 45 degrees.

54. The device of claim 53, wherein the first and second interior angles of the first prism are each greater than or equal to 60 degrees.

55. The device of claim 37, wherein the first prism has a trapezoidal shape, and the second, third, and fourth prisms form a trapezoidal shape.

56. The device of claim 37, and further comprising a fourth reflector disposed in the path of light reflected from the second reflector and diverting the light to the third reflector.

57. The device of claim 56, wherein the fourth reflector is a thin film disposed on the surface of the third prism, the fourth reflector being of such length so as not to block optical signals transmitted through the body of transparent material.

58. The device of claim 56, wherein the fourth reflector is disposed in a recess formed in the third prism, the fourth reflector being of such length so as not to block optical signals transmitted through the body of transparent material.

59. The device of claim 37, and further comprising:
   a first spacer element coupled between the first prism and the second prism; and
   a second spacer element coupled between the first prism and the fourth prism, wherein the first and second spacer elements determine the width of the gap.

60. The device of claim 59, wherein the gap is in a range of about 100–200 micrometers wide.

61. The device of claim 37, further comprising:
   a compression band coupled around the of body of transparent material, the compression band having a contracted state and an extended state, wherein:
      the contracted state causes the body to be in the first state, and
      the extended state causes the body to be in the second state.

62. The device of claim 37, and further comprising:
   a pushing device coupled to the first prism, the pushing device having a retracted state and an extended state, wherein:
      the retracted state causes the body to be in the first state; and
      the extended state causes the body to be in the second state.

63. The device of claim 62, wherein the pushing device is a piezoelectric device.

64. The device of claim 62, wherein the pushing device is a solenoid device.

* * * * *